United States Patent
Tanaka et al.

(10) Patent No.: US 6,731,271 B1
(45) Date of Patent: May 4, 2004

(54) COORDINATE INPUT DEVICE AND ITS CONTROL METHOD, AND COMPUTER READABLE MEMORY

(75) Inventors: Atsushi Tanaka, Yamato (JP);
Masahide Hasegawa, Yokohama (JP);
Kiwamu Kobayashi, Yokohama (JP);
Masaaki Kanashiki, Yokohama (JP);
Yuichiro Yoshimura, Kamakura (JP);
Katsuyuki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/526,464

(22) Filed: Mar. 16, 2000

(30) Foreign Application Priority Data

Mar. 19, 1999 (JP) .............................. 11-076861

(51) Int. Cl.$^7$ .......................... G09G 5/00; G08C 21/00
(52) U.S. Cl. ................. 345/175; 178/18.01; 178/18.09; 178/19.01; 178/19.03; 178/19.05; 178/19.07; 345/179
(58) Field of Search ................. 345/173, 174, 345/175, 176, 179; 178/18.01, 18.03, 18.09, 18.06, 18.07, 19.01, 19.02, 19.03, 19.04, 19.07, 19.05

(56) References Cited

U.S. PATENT DOCUMENTS

| 5,115,230 | A |   | 5/1992  | Smoot ........................ 340/707 |
| 5,164,585 | A | * | 11/1992 | Lieu ........................... 340/707 |
| 5,248,856 | A |   | 9/1993  | Mallicoat .................... 178/18 |
| 5,341,155 | A |   | 8/1994  | Elrod et al. .................. 345/179 |
| 5,444,506 | A |   | 8/1995  | Nakazawa et al. ........... 353/104 |
| 5,570,299 | A |   | 10/1996 | Tokioka et al. .............. 364/560 |
| 5,570,302 | A |   | 10/1996 | Kobayashi et al. .......... 364/561 |
| 5,729,251 | A | * | 3/1998  | Nakashima ................. 345/173 |
| 5,748,183 | A |   | 5/1998  | Yoshimura et al. .......... 345/173 |
| 5,852,434 | A | * | 12/1998 | Sekendur ..................... 345/179 |
| 6,005,556 | A |   | 12/1999 | Kodama et al. ............. 345/175 |
| 6,208,330 | B1 |  | 3/2001  | Hasegawa et al. ........... 345/173 |
| 6,229,601 | B1 | * | 5/2001 | Hasegawa ...................... 356/5 |
| 6,285,359 | B1 | * | 9/2001 | Ogasawara et al. .......... 345/175 |

FOREIGN PATENT DOCUMENTS

| EP | 0 484 160  | 6/1992  |
| JP | 57-142080  | 9/1982  |
| JP | 4-299727   | 10/1992 |
| JP | 4-371069   | 12/1992 |
| JP | 6-230897   | 8/1994  |
| JP | 6-274266   | 9/1994  |
| JP | 7-76902    | 8/1995  |
| JP | 7-200140   | 8/1995  |
| JP | 2503182    | 3/1996  |
| JP | 9-179685   | 7/1997  |
| JP | 10-334176  | 12/1998 |
| JP | 11-219253  | 8/1999  |

* cited by examiner

*Primary Examiner*—Vijay Shankar
(74) *Attorney, Agent, or Firm*—Fitzpatrick, Cella, Harper & Scinto

(57) ABSTRACT

A device has a light-receiving element for receiving light coming from a pointing tool, and a plurality of linear sensors for sensing a beam spot. A controller discriminates if a first signal output from the light-receiving element and a second signal output from the linear sensors are synchronized. A coordinate computation unit outputs a coordinate value corresponding to the beam spot on the basis of the discrimination result.

20 Claims, 24 Drawing Sheets

COORDINATE INPUT DEVICE AND ITS CONTROL METHOD, AND COMPUTER READABLE MEMORY

FIELD OF THE INVENTION

The present invention relates to a coordinate input device used in a large-scale display system and, more particularly, to a coordinate input device which is used to control an externally connected computer and to write a character, figure, and the like.

BACKGROUND OF THE INVENTION

As a conventional coordinate input device, a device which senses an image of a beam spot on a screen using a CCD area sensor or linear sensor, and computes and outputs a coordinate value by an image process using a barycentric coordinate position or pattern matching, or the like, a device which uses a position detection element called a PSD (an analog device which can obtain an output voltage corresponding to the spot position), and the like are known.

For example, Japanese Patent Publication No. 7-76902 discloses a device which detects a coordinate position by sensing an image of a beam spot formed by a collimated beam of visible light, and transmitting/receiving control signals by infrared divergent light. Also, Japanese Patent Laid-Open No. 6-274266 discloses a device which detects a coordinate position using a linear CCD sensor and special optical mask.

On the other hand, Japanese Patent No. 2,503,182 discloses the arrangement of a device using a PSD and a correction method of the output coordinate position.

In recent years, a large-screen display tends to have a larger screen size and higher resolution simultaneously with improvement of brightness. For this reason, the resolving power of a coordinate input device must be improved.

Conventionally, as a coordinate input device of this type, a compact, inexpensive device which uses a ring CCD and is resistant against disturbance light, has been proposed. As an input pointing tool, a pen-shaped tool is used. In this case, since the input area is large, a cordless pen improves the operability. In the coordinate input device using the ring CCD, input light from the pointing tool is flickered, and it is detected by the difference between its ON and OFF states. For this reason, the ON/OFF timing of the input light must be detected cordlessly.

However, incoming light often becomes weak due to an insufficient remaining amount of a battery used in the pointing tool, tilt of the pointing tool, or the like. In such case, synchronization with the ON/OFF timing of the input light cannot be attained, and a wrong coordinate value may be detected. When such coordinate value is sent to a host computer connected to the coordinate input device, the cursor position on the monitor of the host computer that indicates the coordinate position suddenly jumps to a point other than the input point, or a line the operator does not intend is input upon using, e.g., a drawing application.

SUMMARY OF THE INVENTION

The present invention has been made in consideration of the aforementioned problems, and has as its object to provide a coordinate input device which can accurately input a coordinate position, its control method, and a computer readable memory.

In order to achieve the above object, a coordinate input device according to the present invention comprises the following arrangement. That is, there is provided a coordinate input device for generating a beam spot by irradiating a predetermined position of a coordinate input surface with light coming from a pointing tool, and generating a coordinate value corresponding to the beam spot, comprising:

light-receiving means for receiving the light coming from the pointing tool;

sensing means for sensing the beam spot;

synchronization discrimination means for discriminating if a first signal output from the light-receiving means and a second signal output from the sensing means are synchronized; and output means for outputting a coordinate value corresponding to the beam spot on the basis of a discrimination result of the synchronization discrimination means.

In order to achieve the above object, a coordinate input device according to the present invention comprises the following arrangement. That is, there is provided a coordinate input device for generating a beam spot by irradiating a predetermined position of a coordinate input surface with light coming from a pointing tool, and generating a coordinate value corresponding to the beam spot, comprising:

light-receiving means for receiving the light coming from the pointing tool;

sensing means for sensing the beam spot;

synchronization discrimination means for discriminating if a first signal output from the light-receiving means and a second signal output from the sensing means are synchronized; and control means for controlling a clear timing of information sensed by the sensing means on the basis of a discrimination result of the synchronization discrimination means.

In order to achieve the above object, a method of controlling a coordinate input device according to the present invention comprises the following arrangement. That is, there is provided a method of controlling a coordinate input device for generating a beam spot by irradiating a predetermined position of a coordinate input surface with light coming from a pointing tool, and generating a coordinate value corresponding to the beam spot, comprising:

a light-receiving step of receiving the light coming from the pointing tool;

a sensing step of sensing the beam spot using a sensor;

a synchronization discrimination step of discriminating if a first signal output in the light-receiving step and a second signal output from the sensor are synchronized; and an output step of outputting a coordinate value corresponding to the beam spot on the basis of a discrimination result in the synchronization discrimination step.

In order to achieve the above object, a method of controlling a coordinate input device according to the present invention comprises the following arrangement. That is, there is provided a method of controlling a coordinate input device for generating a beam spot by irradiating a predetermined position of a coordinate input surface with light coming from a pointing tool, and generating a coordinate value corresponding to the beam spot, comprising:

a light-receiving step of receiving the light coming from the pointing tool;

a sensing step of sensing the beam spot using a sensor;

a synchronization discrimination step of discriminating if a first signal output in the light-receiving step and a second signal output from the sensor are synchronized; and a control step of controlling a clear timing of information sensed by the sensor on the basis of a discrimination result in the synchronization discrimination step.

In order to achieve the above object, a computer readable memory according to the present invention comprises the following arrangement. That is, there is provided a computer readable memory which stores a program code of controlling a coordinate input device for generating a beam spot by irradiating a predetermined position of a coordinate input surface with light coming from a pointing tool, and generating a coordinate value corresponding to the beam spot, comprising:

a program code of a light-receiving step of receiving the light coming from the pointing tool;

a program code of a sensing step of sensing the beam spot using a sensor;

a program code of a synchronization discrimination step of discriminating synchronization between a first signal output in the light-receiving step, and a second signal output from the sensor; and a program code of an output step of outputting a coordinate value corresponding to the beam spot on the basis of a discrimination result in the synchronization discrimination step.

In order to achieve the above object, a computer readable memory according to the present invention comprises the following arrangement. That is, there is provided a computer readable memory which stores a program code of controlling a coordinate input device for generating a beam spot by irradiating a predetermined position of a coordinate input surface with light coming from a pointing tool, and generating a coordinate value corresponding to the beam spot, comprising:

a program code of a light-receiving step of receiving the light coming from the pointing tool;

a program code of a sensing step of sensing the beam spot using a sensor;

a program code of a synchronization discrimination step of discriminating synchronization between a first signal output in the light-receiving step, and a second signal output form the sensor; and a program code of a control step of controlling a clear timing of information sensed by the sensor on the basis of a discrimination result in the synchronization discrimination step.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The preferred embodiments of the present invention will be described in detail hereinafter with reference to the accompanying drawings.

A schematic arrangement of an optical coordinate input device according to the present invention will be explained first using FIG. 1.

First Embodiment

Figure 1:
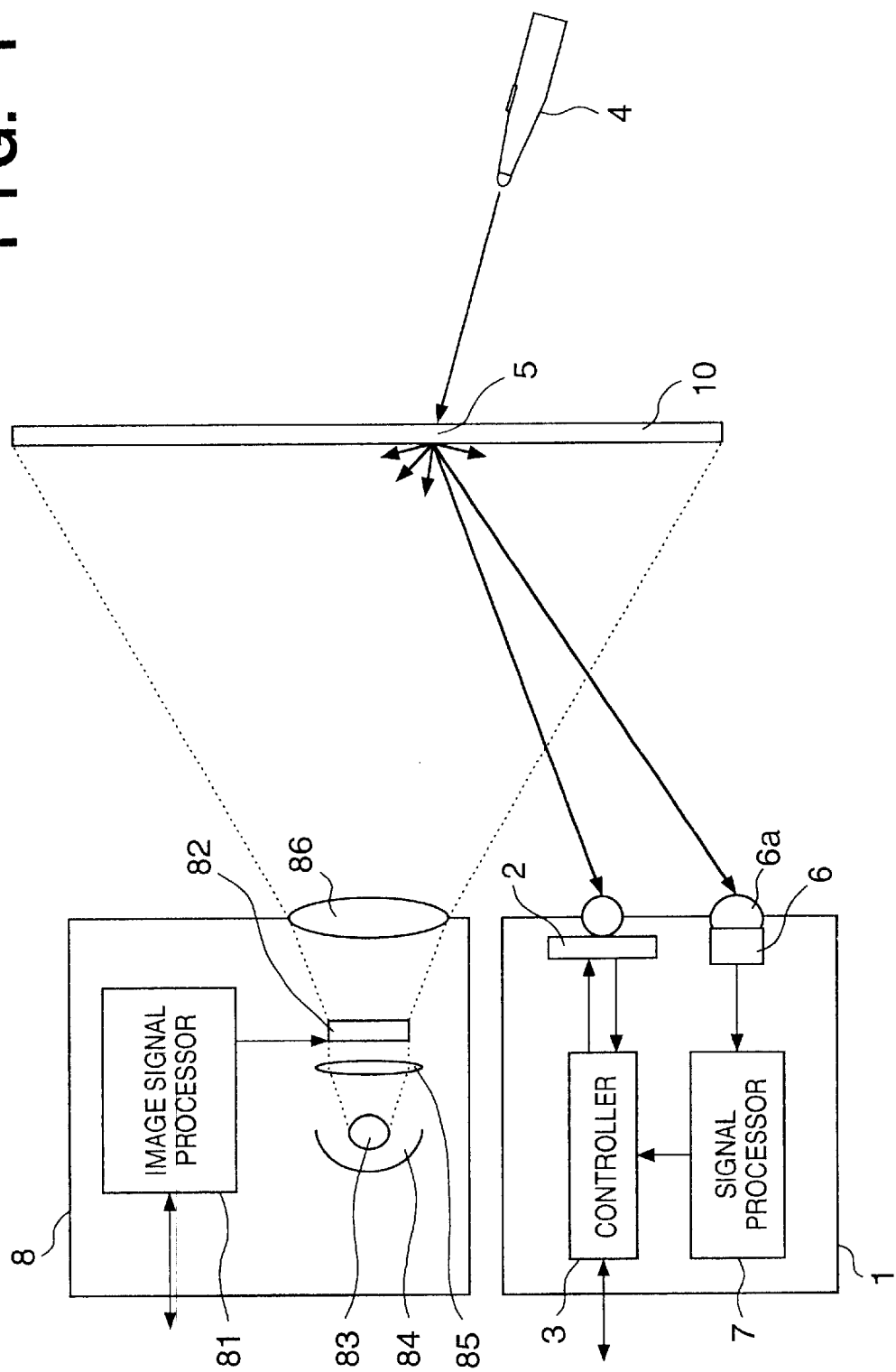
FIG. 1 is a schematic view showing the arrangement of a coordinate input device according to the first embodiment of the present invention.

FIG. 1 shows a schematic arrangement of a coordinate input device of the first embodiment.

The coordinate input device of this embodiment is roughly constructed by a pointing tool 4 for forming a beam 5 on a screen 10 as a coordinate input surface, and a coordinate detector 1 for detecting the coordinate position and the like of the beam spot 5 on the screen 10. FIG. 1 also shows a projection display device 8 for displaying an image or the coordinate position or the like on the screen 10 as an output device, together with the arrangements of those components.

The coordinate detector 1 comprises a coordinate detection sensor unit 2, a controller 3 for controlling the coordinate detection sensor unit 2, and making coordinate operations and the like, a light-receiving element 6, and a signal processor 7. By detecting the coordinate position of the beam spot 5 on the screen 10, and a control signal corresponding to the states of individual switches (to be described later) of the pointing tool 4, the controller 3 sends that information to an externally connected device (not shown).

The projection display device 8 comprises an image signal processor 81 which receives an image signal from a display signal source as an externally connected device such as a host computer (not shown) or the like, a liquid crystal panel 82 controlled by the image signal processor 81, an illumination optical system including a lamp 83, mirror 84, and condenser lens 85, and a projection lens 86 for projecting an image formed by the liquid crystal panel 82 onto the screen 10, and can display desired image information on the screen 10. Since the screen 10 has appropriate light diffusion characteristics to broaden the observation range of the projected image, a light beam emitted by the pointing tool 4 is diffused at the position of the beam spot 5, and some light components of the light diffused at the position of the beam spot enter the coordinate detector 1 irrespective of the position on the screen or the direction of the light beam.

With this arrangement, the operator inputs character information or line image information using the pointing tool 4 on the screen 10, and displays the input information by the projection display device 8, thus inputting/outputting information like when he or she uses "paper & pencil", and also freely allowing button operations and input operations for, e.g., selecting and determining icons.

<Detailed Description of Pointing Tool 4>

Figure 2:
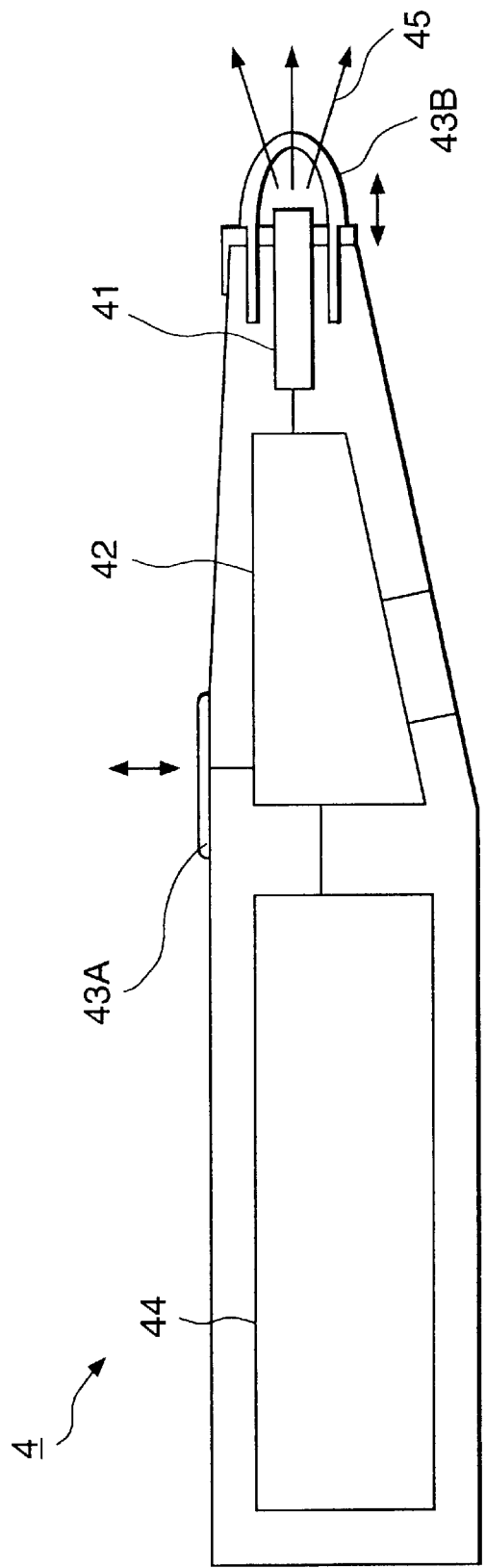
FIG. 2 is a view showing the arrangement of a pointing tool of the first embodiment in detail.

FIG. 2 shows the arrangement of the pointing tool of the first embodiment in detail.

The pointing tool 4 incorporates a light-emitting element 41 such as an LED or the like for emitting infrared light, an emission controller 42 for controlling to drive the light-emitting element 41, a power supply 44, and two operation switches 43A and 43B. The emission controller 42 controls to turn on/off emission in correspondence with the states of the operation switches 43A and 43B, and controls emission by superposing a control signal in accordance with a modulation method (to be described later).

The operator holds the pointing tool 4 and directs its distal end toward the screen 10. At this time, infrared light 45 is emitted when the operator holds down the operation switch 43A or presses the operation switch 43B against the screen. In this manner, the beam spot 5 is formed on the screen 10, and a coordinate signal begins to be output by a predetermined process.

The infrared light 45 contains the presence/absence of modulation, and encoded switch information and pen ID information, the coordinate detector 1 reads these pieces of information, and the controller sends the coordinate value, switch information, and pen ID information to the host computer.

Upon receiving the switch information indicating that, for example, the operation switch 43B is ON, the host computer determines "pen down" and makes the same operation as the left-button operation of a mouse used in a DOS/V machine. Upon using, e.g., a drawing program, a line or the like can be drawn in this state. Also, the operation switch 43A can be used as the right button of the mouse used in the DOS/V machine.

The light-emitting element 41 starts emission once either the operation switch 43A or 43B is turned on, and proceeds with emission for a predetermined period of time after the switch is turned off. In this sate, only the cursor on the screen moves. In this manner, the operator can easily operate by quickly and accurately drawing a character or figure at an arbitrary position on the screen 10, or selecting a button or menu.

The emission time can be determined in consideration of the service life of a battery, and for example, the emission time of several ten seconds can give sufficient use feeling.

In the first embodiment, the switch information is superposed on infrared light by two different methods. Especially, since the switch information of the operation switch 43B is updated relatively frequently, it is expressed by the presence/absence of modulation of the infrared light.

The timing chart of infrared light emitted upon operation of the operation switch 43B will be explained below using FIG. 3.

Figure 3:
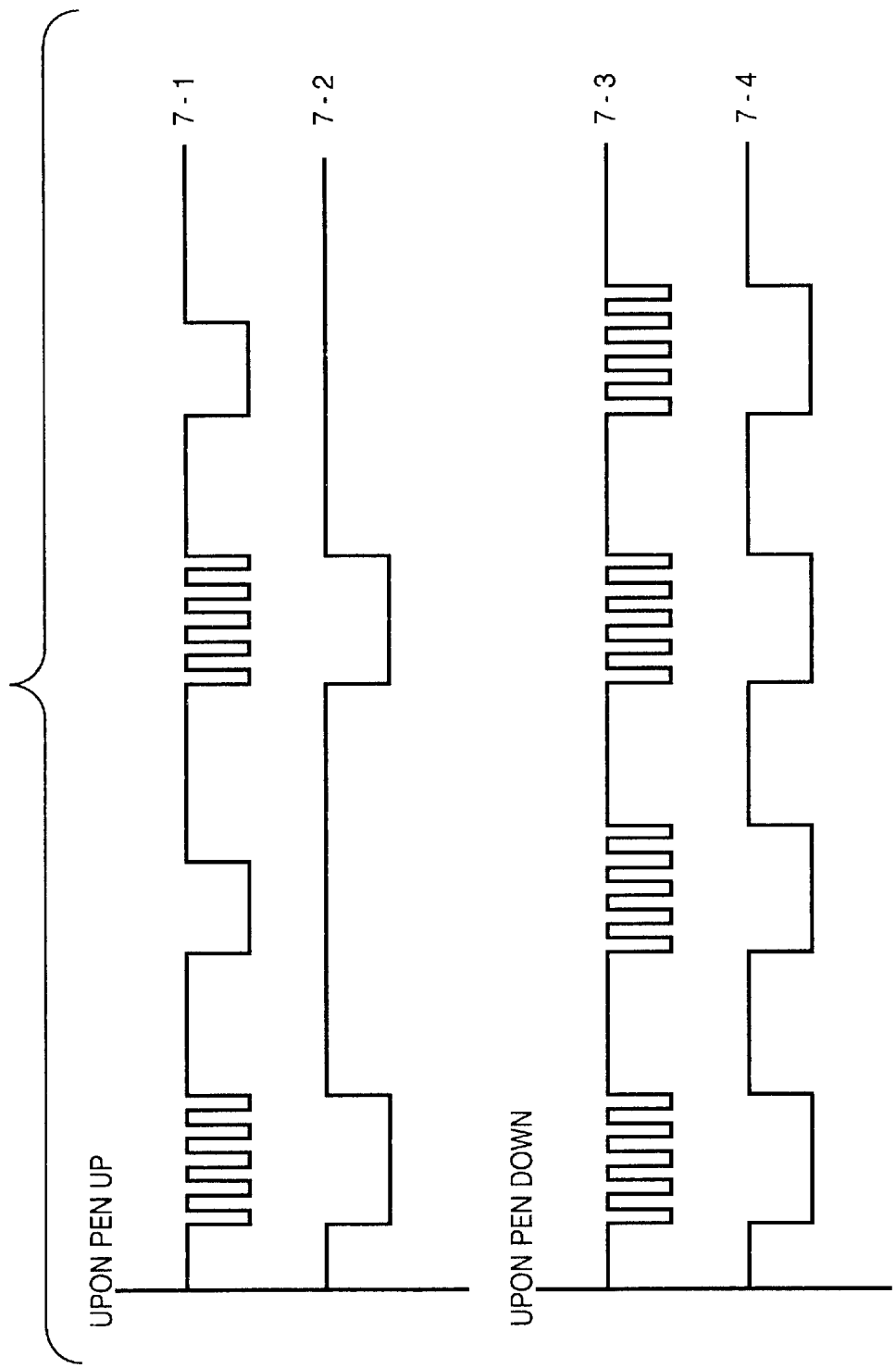
FIG. 3 is a timing chart of infrared light emitted upon operation of an operation switch 43B in the first embodiment.

FIG. 3 is a timing chart of infrared light emitted upon operation of the operation switch 43B of the first embodiment.

As indicated by 7-1 in FIG. 3, upon "pen up" of the operation switch 43B, modulated light and non-modulated light pulses are alternately emitted. On the other hand, as indicated by 7-3, upon "pen down" of the operation switch 43B, modulated light pulses are always output.

In the coordinate detector 1, the light-receiving element 6 detects the modulated light pulses, and a frequency detecting unit (to be described later) extracts only the modulated light pulses. When the extracted modulated light pulses continuously appear within a predetermined period of time, as indicated by 7-4, "pen down" is determined. On the other hand, when the extracted modulated light pulses are spaced apart, as indicated by 7-2, "pen up" is determined.

The timing chart of infrared light emitted upon operation of the operation switch 43A will be explained below using FIG. 4.

Figure 4:
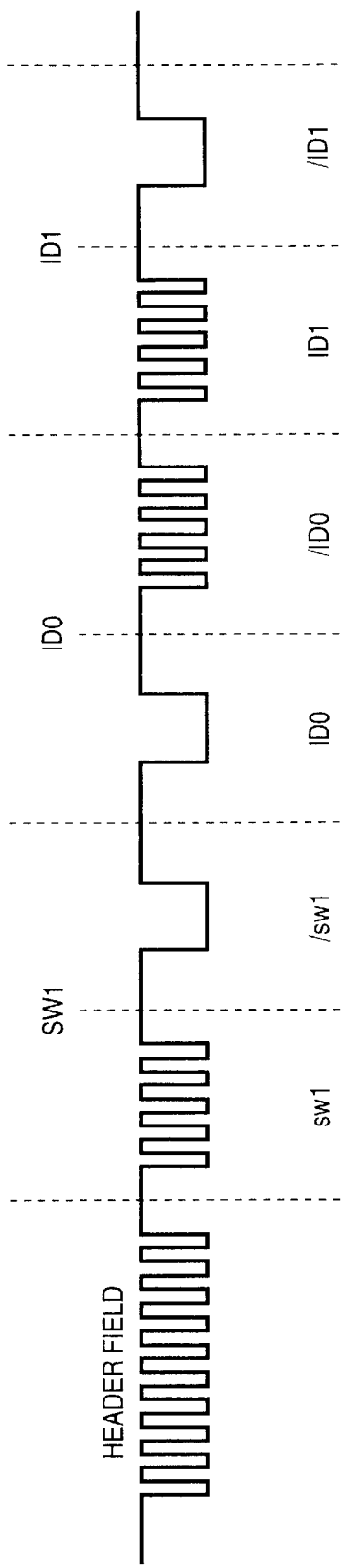
FIG. 4 is a timing chart of infrared light emitted upon operation of an operation switch 43A in the first embodiment.

FIG. 4 is a timing chart of infrared light emitted upon operation of the operation switch 43A of the first embodiment.

The switch information and pen ID information contained in infrared light emitted upon operation of the operation switch 43A are detected by the coordinate detector 1 by another method. In this method, a header field is assigned in the infrared light, and upon detecting the header field, the ON/OFF state of the operation switch 43A and pen ID information are discriminated on the basis of the pattern of modulated light pulses that follow the header field. In this discrimination, "0" or "1" is expressed by the aforementioned modulated or non-modulated light pulses.

Also, since inverted information of each state (for example, /SW1 for SW1) is sent to be paired with non-inverted information, discrimination errors or the like can be prevented.

In the first embodiment, only two operation switches are provided. However, the number of switches is not limited to two, and three or more operation switches may be provided. The roles of the individual operation switches can be re-defined by a driver or the like on the host computer side, and those suitable for the use pattern of the user can be selected.

<Detailed Description of Coordinate Detector 1>

Figure 5:
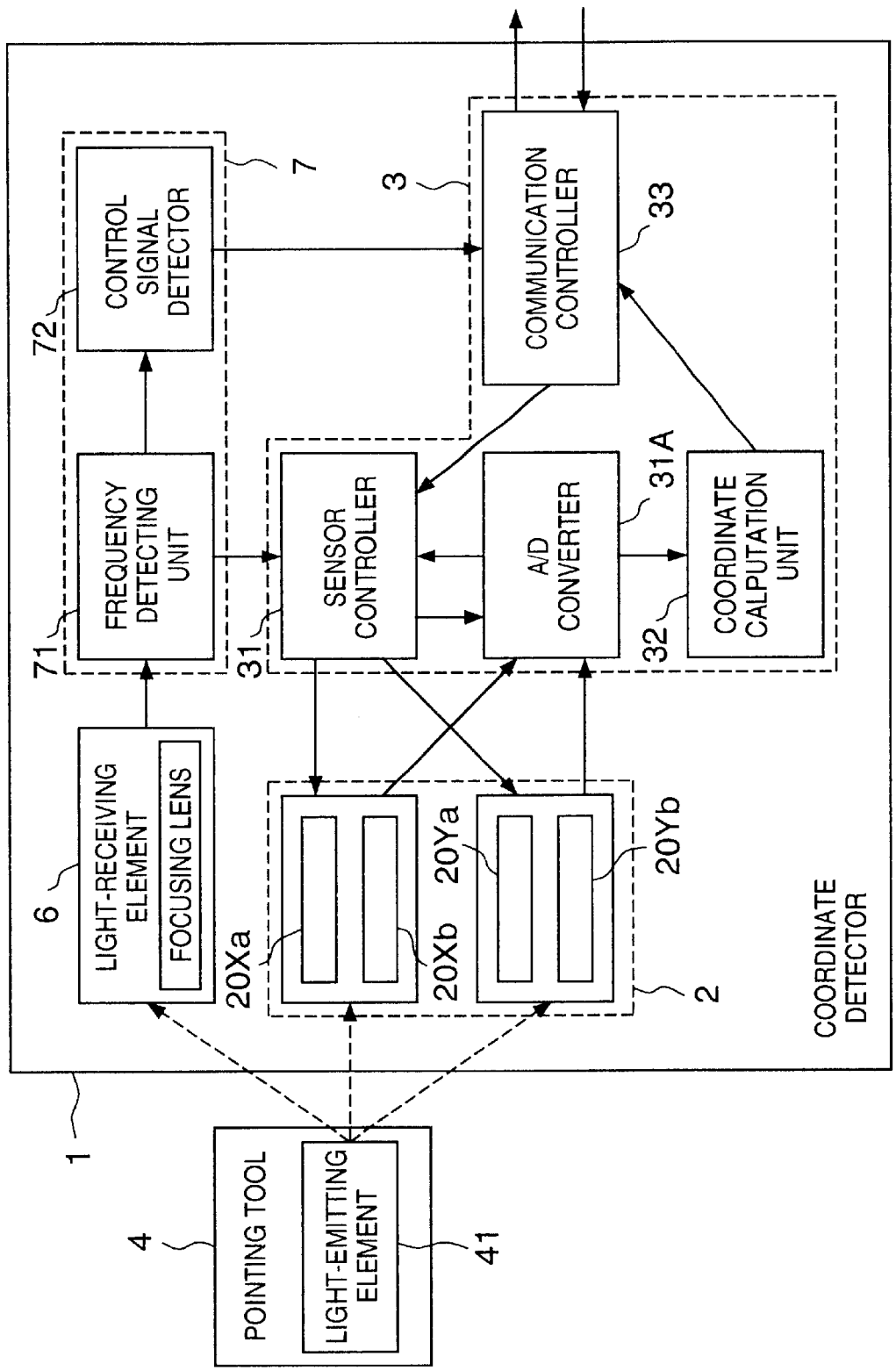
FIG. 5 is a block diagram showing the arrangement of a coordinate detector of the first embodiment in detail.

FIG. 5 shows the detailed arrangement of the coordinate detector of the first embodiment.

The coordinate detector 1 has the light-receiving element 6 for detecting the amount of light at high sensitivity by means of a focusing optical system, and four linear sensors 20X$a$, 20X$b$, 20Y$a$, and 20Y$b$ for detecting the incoming direction of light by an imaging optical system. These light-receiving element and linear sensors respectively receive diffused light from the beam spot 5 formed on the screen 10 by the light beam coming from the light-emitting element 41 built in the pointing tool 4.

<Description of Operation of Focusing Optical System>

A focusing lens 6$a$ serving as the focusing optical system is attached to the light-receiving element 6, and detects the amount of light having a predetermined wavelength at high sensitivity from the whole range on the screen 10. This detection output is detected by a frequency detecting unit 71, and is then demodulated by a control signal detector 72 into a digital signal including data such as a control signal (a signal superposed by the emission controller 42 of the pointing tool 4) and the like.

Since the first embodiment does not have any means for sending a timing signal such as a cord or the like, the linear sensors 20X$a$, 20X$b$, 20Y$a$, and 20Y$b$ are controlled by a modulated signal. As will be described later, signal detection is done based on the difference between signals obtained at the emission and non-emission timings. In order to synchronize that shutter timing with the emission timing, a reset signal for the linear sensors 20X$a$, 20X$b$, 20Y$a$, and 20Y$b$ is generated using the timing of the modulated signal.

The timing chart of signals used in the frequency detecting unit 71 will be explained using FIG. 6.

Figure 6:
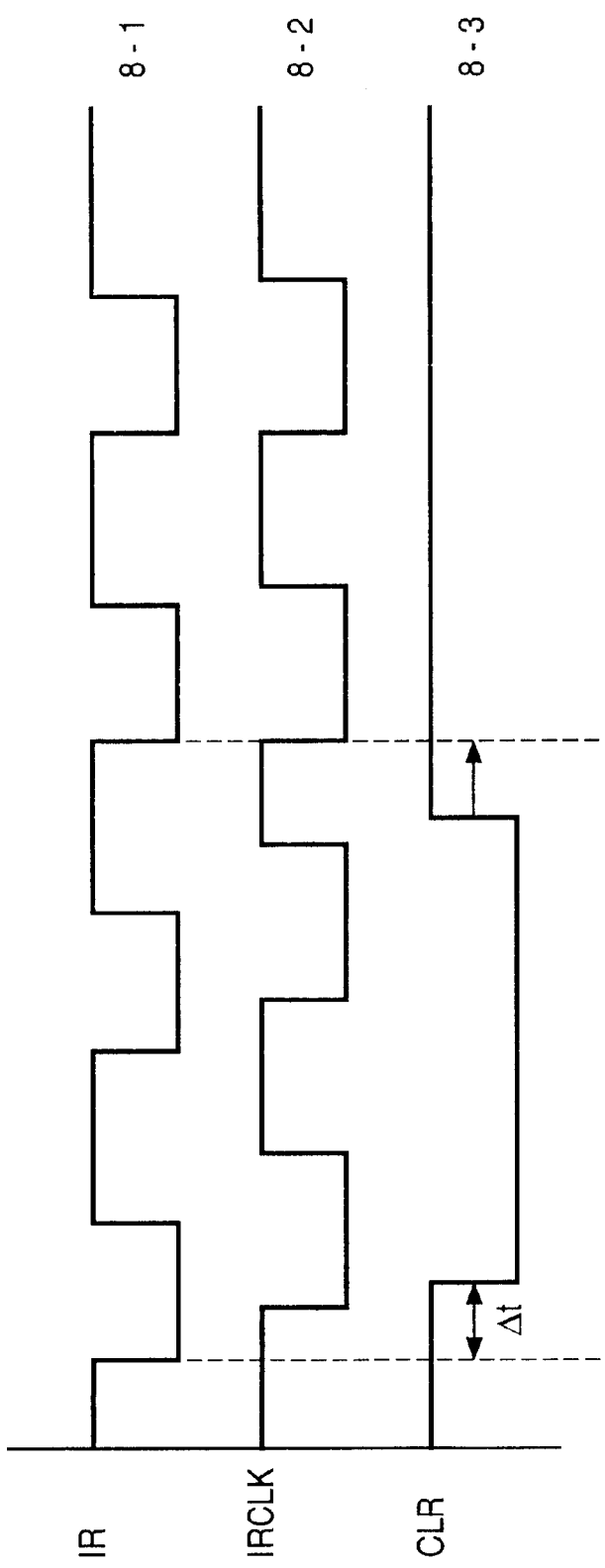
FIG. 6 is a timing chart of signals used in a frequency detecting unit of the first embodiment.

FIG. 6 is a timing chart of signals used in the frequency detecting unit 71 of the first embodiment.

Figure 8:
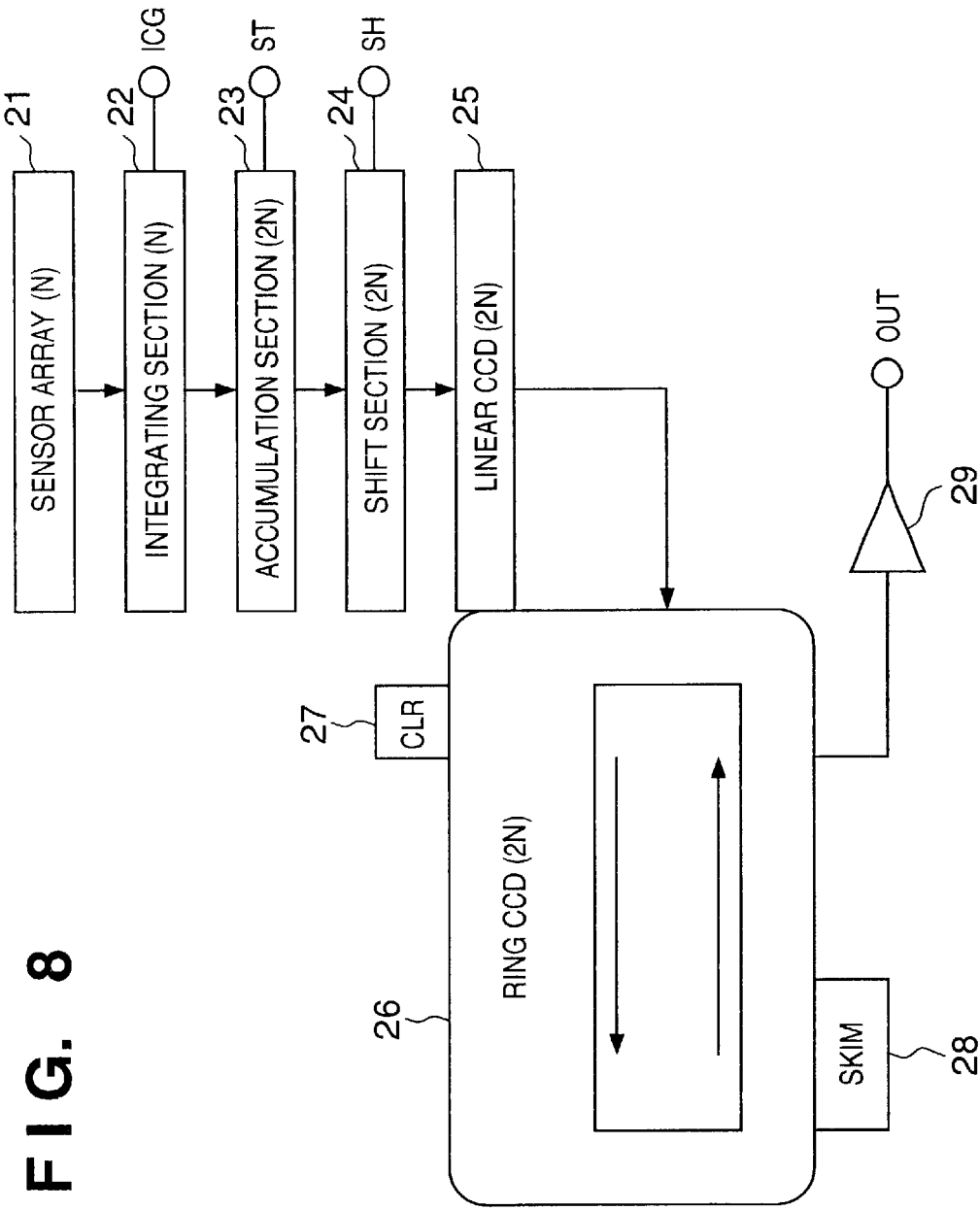
FIG. 8 is a block diagram showing the arrangement of a linear sensor of the first embodiment in detail.

Referring to FIG. 6, 8-1 indicates a signal IR obtained after the modulated signal upon "pen down" is detected by the frequency detecting unit 71. Since this signal IR represents an emission period, the shutter timing of the linear sensors 20X$a$, 20X$b$, 20Y$a$, and 20Y$b$ must be synchronized with this signal.

On the other hand, 8-2 indicates a signal IRCLK which represents a shutter period of the linear sensors 20X$a$, 20X$b$, 20Y$a$, and 20Y$b$, and indicates the emission detection signal when it is L (low level) and indicates the non-emission detection timing when it is H (high level). This signal IRCLK is output from the linear sensors 20X$a$, 20X$b$, 20Y$a$, and 20Y$b$ on the basis of clocks supplied thereto. In order to synchronize this signal IRCLK with the emission period, a clear (CLR) signal (8-3) is output to the linear sensors 20X$a$, 20X$b$, 20Y$a$, and 20Y$b$ a predetermined delay time in which the signals IR and IRCLK can be synchronized after the signal IR indicated by 8-1 is detected.

This clear operation attains synchronization. The delay amount can be determined by the time required until the signal IRCLK goes LOW after the signal CLR ends.

<Description of Operation of Imaging Optical System>

Figure 7:
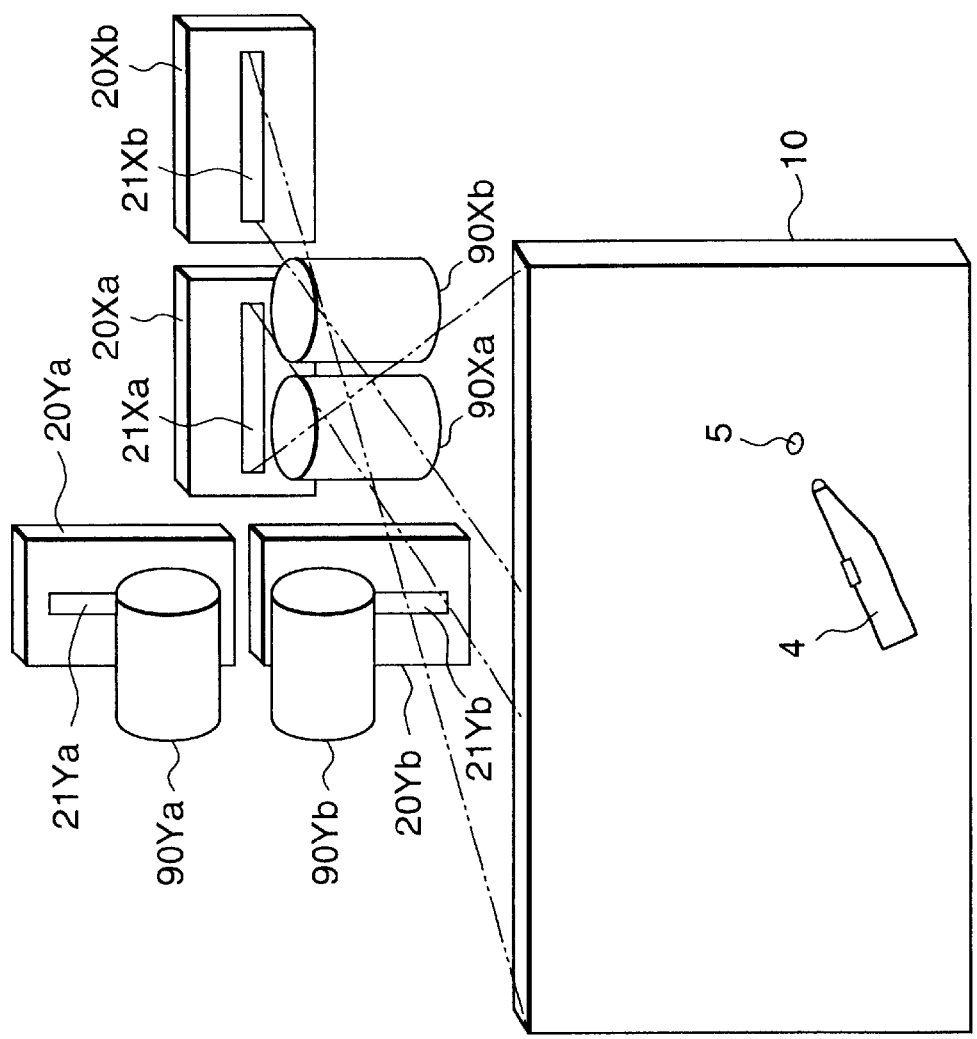
FIG. 7 is a view showing the positional relationship among linear sensors 20Xa, 20Xb, 20Ya, and 20Yb of the first embodiment.

FIG. 7 shows the positional relationship of the linear sensors 20X$a$, 20X$b$, 20Y$a$, and 20Y$b$ in the first embodiment.

Referring to FIG. 7, cylindrical lenses 90X$a$, 90X$b$, 90Y$a$, and 90Y$b$ serving as the imaging optical system form images of the beam spot 5 in a linear pattern on photosensitive portions (sensor arrays) 21X$a$, 21X$b$, 21Y$a$, and 21Y$b$ of the linear sensors 20X$a$, 20X$b$, 20Y$a$, and 20Y$b$. By laying out these linear sensors 20X$a$, 20X$b$, 20Y$a$, and 20Y$b$ to make right angles, outputs having peaks in pixels that reflect X- and Y-coordinates can be obtained.

These linear sensors 20X$a$, 20X$b$, 20Y$a$, and 20Y$b$ are controlled by a sensor controller 31, and their output signals are sent to a coordinate computation unit 32 as digital signals converted by an A/D converter 31A connected to the sensor controller 31. The coordinate computation unit 32 computes an output coordinate value based on the input digital signals, and outputs the computation result to an external control device (not shown) via a communication controller 33 by a predetermined communication method together with data such as a control signal and the like from the control signal detector 72. When an operation unlike in a normal state (e.g., setting of a user calibration value) is done upon, e.g., adjustment, the communication controller 33 sends a mode switching signal to the sensor controller 31 and coordinate computation unit 32.

In the present invention, the image of the beam spot 5 is intentionally blurred using focal point adjustment or a diffusion film or the like so that it has an image width several times that of the pixels of each of the linear sensors 20X$a$, 20X$b$, 20Y$a$, and 20Y$b$. However, if the image is blurred too much, since the peak level lowers, the image width of about several pixels is optimal. One characteristic feature of the present invention is that the linear sensors 20X$a$, 20X$b$, 20Y$a$, and 20Y$b$ each having a CCD with a small number of pixels, and an appropriately blurred optical system are used. Using such combination, a coordinate input device which can reduce the computation data volume, and can assure very high resolving power, precision, and operation speed, and low cost using the compact sensors and optical system can be realized.

The X-coordinate detection linear sensors 20X$a$ and 20X$b$ having CCD arrays have the same arrangement as that of the Y-coordinate detection linear sensors 20Y$a$ and 20Y$b$, and their detailed arrangement will be explained below using FIG. 8.

FIG. 8 shows the detailed arrangement of the linear sensor of the first embodiment.

A sensor array 21 serving as a light-receiving portion consists of N pixels (64 pixels in the first embodiment), and stores a charge corresponding to the received light amount in an integrating section 22. The integrating portion 22 consists of N blocks, and can be reset by applying a voltage to a gate ICG, thus allowing an electronic shutter operation. The charge stored in this integrating section 22 is transferred to an accumulation section 23 by applying a pulse voltage to an electrode ST. The accumulation section 23 consists of 2N blocks, which individually accumulate charges in correspondence with H (high level) and L (low level) of the signal IRCLK synchronous with the emission timing of the pointing tool 4. After that, the charges individually accumulated in synchronism with the ON and OFF timings of light are transferred to a linear CCD section 25 consisting of 2N blocks via a shift section 24 which consists of 2N blocks and facilitates transfer clocks.

In this manner, the linear CCD section 25 stores, in a line, pairs of charges of the sensor outputs from the N pixels, which correspond to the ON and OFF states of light. The charges stored in a line in the linear CCD section 25 are transferred in turn to a ring CCD section 26 consisting of 2N blocks. The ring CCD 26 is cleared by a CLR section 27 in response to the signal CLR, and sequentially accumulates charges transferred from the linear CCD section 25.

The charges accumulated in this manner are read by an amplifier 29. The amplifier 29 outputs a voltage proportional to the accumulated charge amount in a nondestructive manner. In practice, the amplifier 29 amplifies and outputs a difference between neighboring charge amounts, i.e., a value obtained by subtracting a charge amount obtained at the OFF timing of the light-emitting element 41 from that at the ON timing.

An example of the output waveforms of the linear sensors 20X$a$, 20X$b$, 20Y$a$, and 20Y$b$ obtained at that time will be explained below using FIG. 9.

Figure 9:
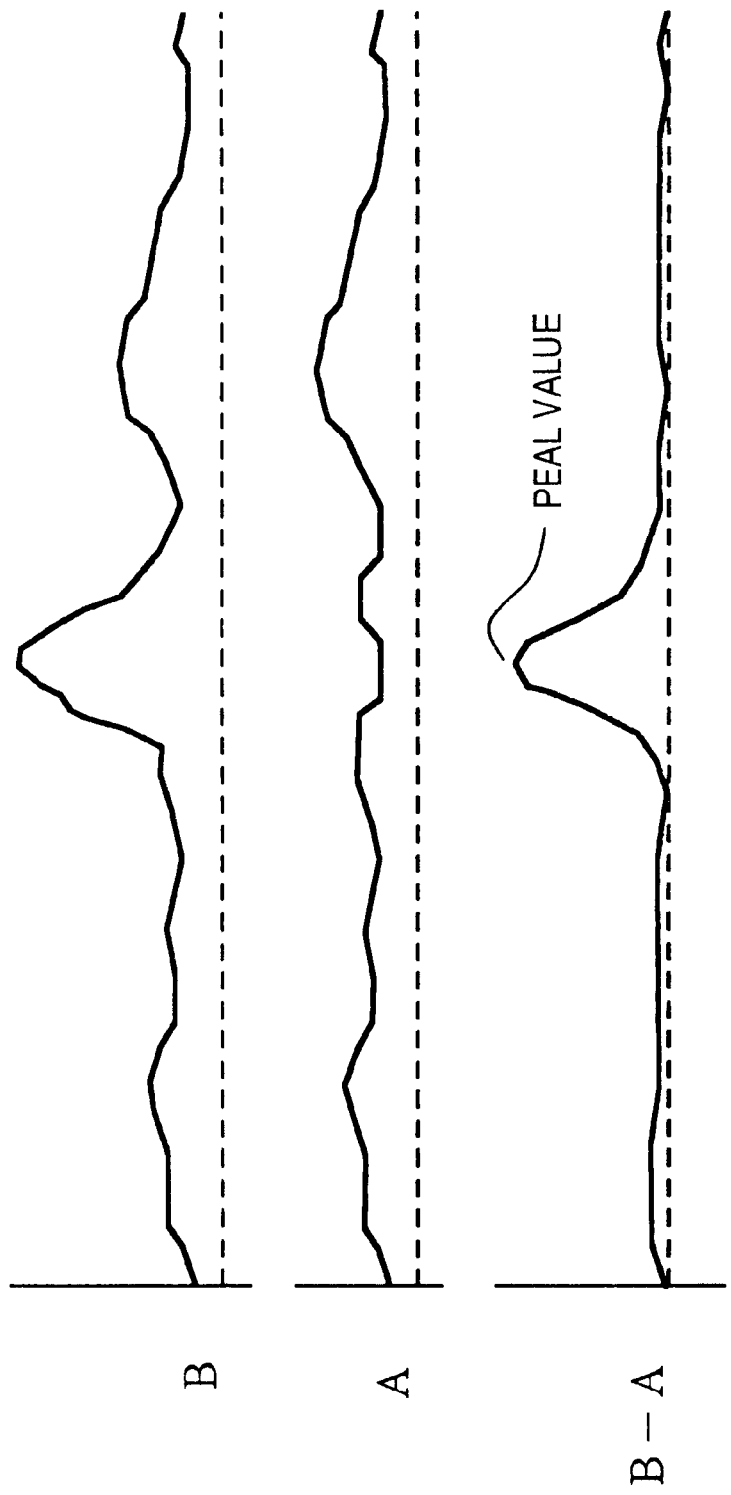
FIG. 9 is a waveform chart showing an example of the output waveforms of the linear sensors of the first embodiment.

FIG. 9 shows an example of the output waveforms of the linear sensors of the first embodiment.

In FIG. 9, a waveform B is formed by reading only signals at the ON timing of the light-emitting element 41, and a waveform A is obtained at the OFF timing, i.e., formed by only disturbance light (as shown in FIG. 8, the ring CCD 26 stores charges of pixels corresponding to these waveforms A and B at neighboring positions). The amplifier 29 nondestructively amplifies and outputs the difference value (waveform B−A) between the neighboring charge amounts. In this manner, a signal of an image formed by only light coming from the pointing tool 4 can be obtained, and a stable coordinate input can be attained without being influenced by disturbance light (noise).

If the maximum value of the waveform B−A shown in FIG. 9 is defined as a PEAK value, the PEAK value increases with increasing accumulation time in which the linear sensors 20Xa, 20Xb, 20Ya, and 20Yb function with respect to light. In other words, if the time for one period of the signal IRCLK is defined to be a unit accumulation time, and the number n of times of accumulation is defined using that time as a unit, the PEAK value increases with increasing number n of times of accumulation. By detecting if the PEAK value reaches a predetermined value TH1, an output waveform having given quality can always be obtained.

Figure 10:
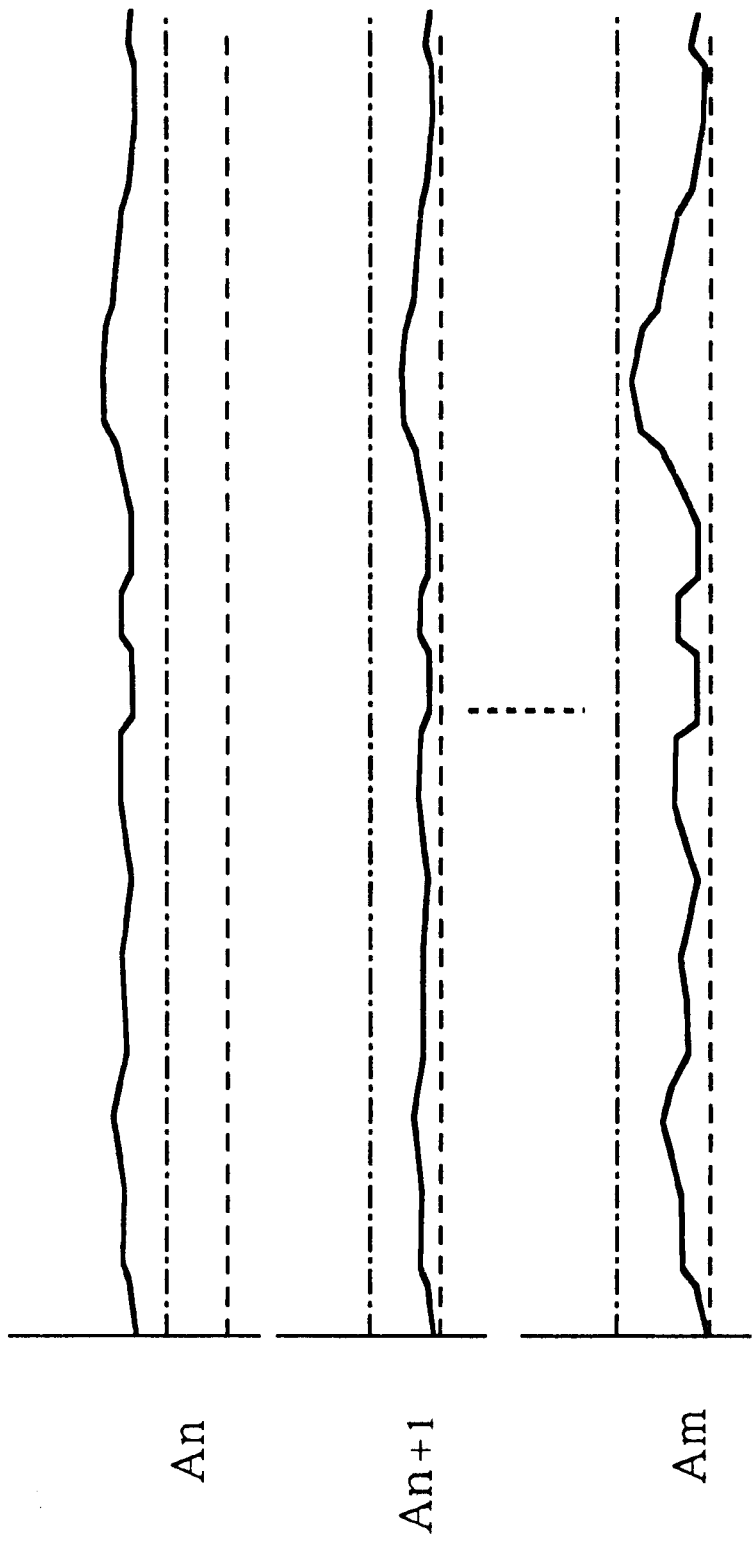
FIG. 10 is a waveform chart showing an example of the output waveforms to explain the skim operation of the linear sensors of the first embodiment.

On the other hand, when disturbance light is very intense, the transferred charges of the ring CCD 26 may be saturated before the peak of the differential waveform B−A reaches a sufficient value. In consideration of such case, each of the linear sensors 20Xa, 20Xb, 20Ya, and 20Yb has a SKIM section 28 having a skim function. The SKIM section 28 monitors the level of a non-emission signal, and in FIG. 10 when the signal level has exceeded a predetermined value in a waveform An obtained by n-th accumulation (one-dashed chain curve in FIG. 10), the SKIM section 28 skims a predetermined amount of charges from pixels corresponding to the waveforms A and B. In this manner, a waveform An+1 is obtained by the next (n+1)-th accumulation, and by repeating this process, accumulation of the signal charges can proceed without being saturated even under very intense disturbance light.

Therefore, even when the amount of flickering light coming from the pointing tool 4 is very small, a signal waveform having a sufficiently large magnitude can be obtained by repeating integrating operations a large number of times. Especially, when the pointing tool 4 uses a light-emitting source of the visible light range, since a signal of a display image is superposed, a sharp waveform which suffers little noise can be obtained using the aforementioned skim function and differential output.

The timing chart in the output control of the ring CCD 26 will be described below with reference to FIG. 11.

Figure 11:
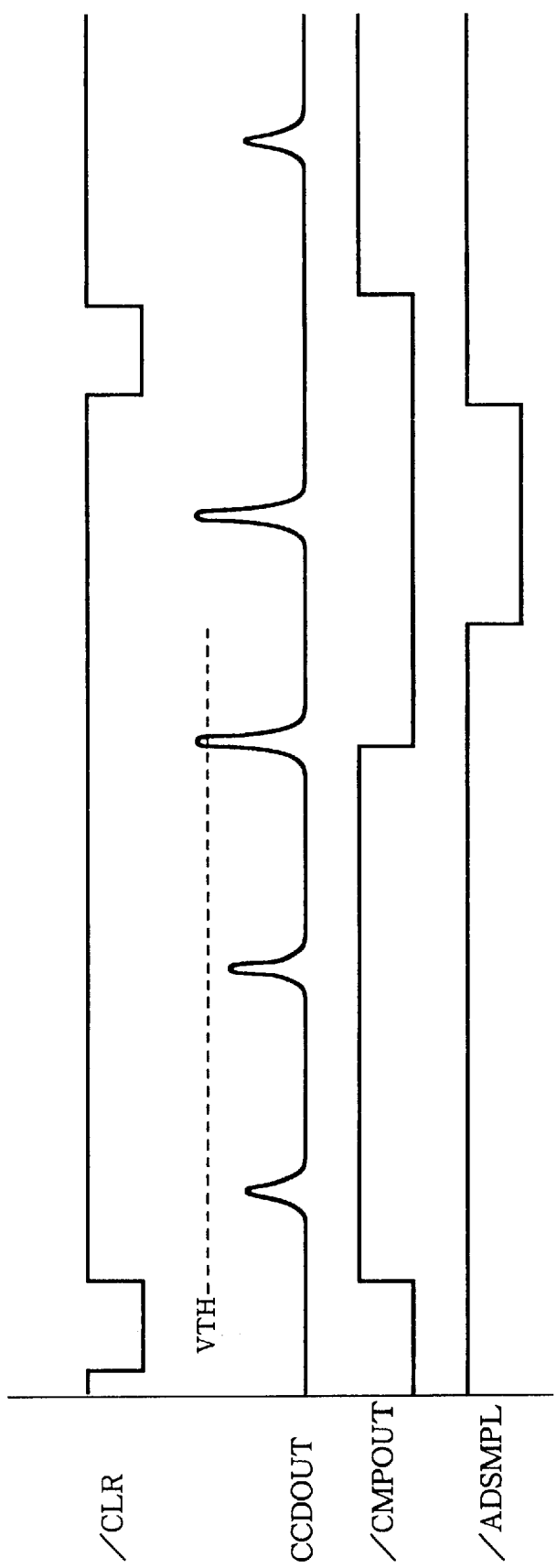
FIG. 11 is a timing chart in the output control of a ring CCD of the first embodiment.

FIG. 11 is a timing chart in the output control of the ring CCD of the first embodiment.

All operations are cleared by the signal CLR a predetermined delay time after the signal IR. If an input is made by the pointing tool 4, a detection signal such as a signal CCDOUT increases by the integrating operation. When the detection signal has exceeded a predetermined level (VTH), the integrating operation of the ring CCD 26 is stopped in response to the trailing edge of a signal CMPOUT output from a comparator. The sensor controller 31 starts A/D conversion in response to the trailing edge of the signal CMPOUT. The A/D conversion period is set to A/D-convert all pixel outputs from the ring CCD 26, as indicated by a signal ADSMPL.

As described above, when the output from the ring CCD 26 does not exceed the predetermined level, the sensor controller 31 counts the time elapsed from the clear timing. When a predetermined period of time has elapsed from the clear timing, the controller 31 forcibly starts A/D conversion. In this manner, even when an input is small, sampling can be done within a predetermined sampling period.

Figure 12:
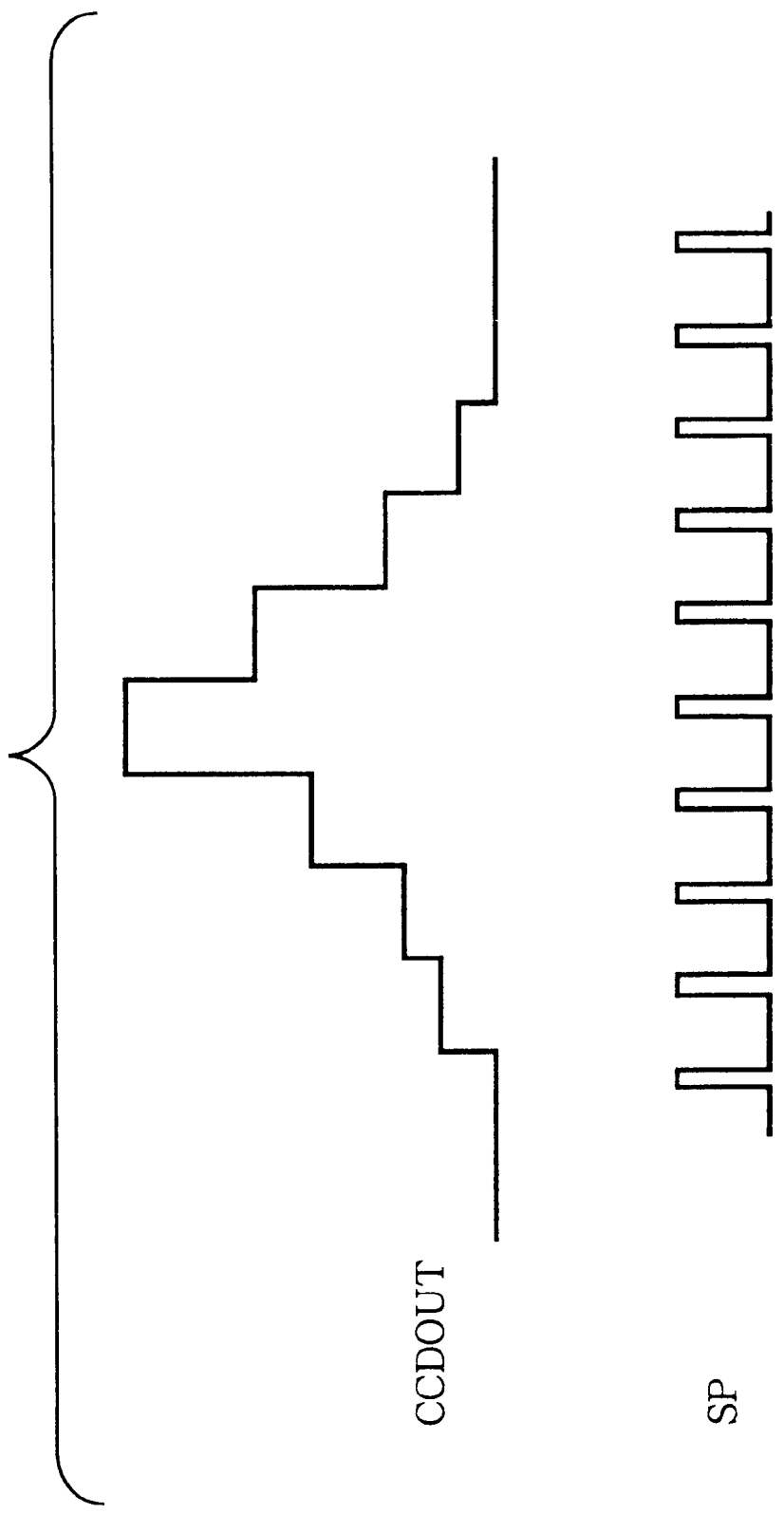
FIG. 12 is a timing chart of A/D conversion of the first embodiment.

A/D conversion is done at the timing shown in FIG. 12. The signal CCDOUT as the output from the ring CCD is output as a voltage corresponding to the detected light level in units of pixels, as shown in FIG. 12, when the time axis is illustrated in an enlarged scale. This signal is A/D converted in units of pixels at the timings of sampling pulses SP, and the sensor controller 31 stores that level in a memory or the like.

The aforementioned operations are done for all the ring CCDs 26 corresponding to the respective coordinate axis, and coordinate computations (to be described below) are made.

Light from the pointing tool 4 that reaches the coordinate detector 1 varies as the power supply unit (battery) 44 built in the pointing tool 4 is consumed, and also varies depending on the posture of the pointing tool 4. Especially, when the screen 10 has low light diffusion characteristics, the front luminance of the displayed image improves, but variations of the amount of light input to the coordinate detector 1, that depend on the posture of the pointing tool 4 increase. However, in the present invention, the number of times of integration automatically follows to always obtain a stable output signal even in such case, thus allowing stable coordinate detection.

As described above, since an RF carrier is added to flickering light and the timing of the integrating operation is controlled by a demodulated signal of a predetermined period obtained by frequency-detecting that carrier, a coordinate input device which can cordlessly synchronize the pointing tool and image sensing section and is easy to use can be realized. Also, since an integration control means which monitors the peak level of a differential signal from the integrating section and stops the integrating operation is provided, even when the amount of light has changed, a beam spot image signal having nearly a constant level can be generated and, hence, a stable coordinate computation result with high resolving power can always be obtained.

<Coordinate Value Computation>

The coordinate computation process in the coordinate computation unit 32 will be described below.

The output signals (differential signals from the amplifiers 29) from the four linear sensors 20Xa, 20Xb, 20Ya, and 20Yb obtained as described above are sent to the coordinate computation unit 32 as digital signals converted by the A/D converter 31A connected to the sensor controller 31, and coordinate values are computed. The coordinate values are respectively computed from the outputs in the X- and Y-coordinate directions. Note that the same computation process is done for the X- and Y-coordinates, and only the computation process of the X-coordinate value will be explained.

Figure 13:
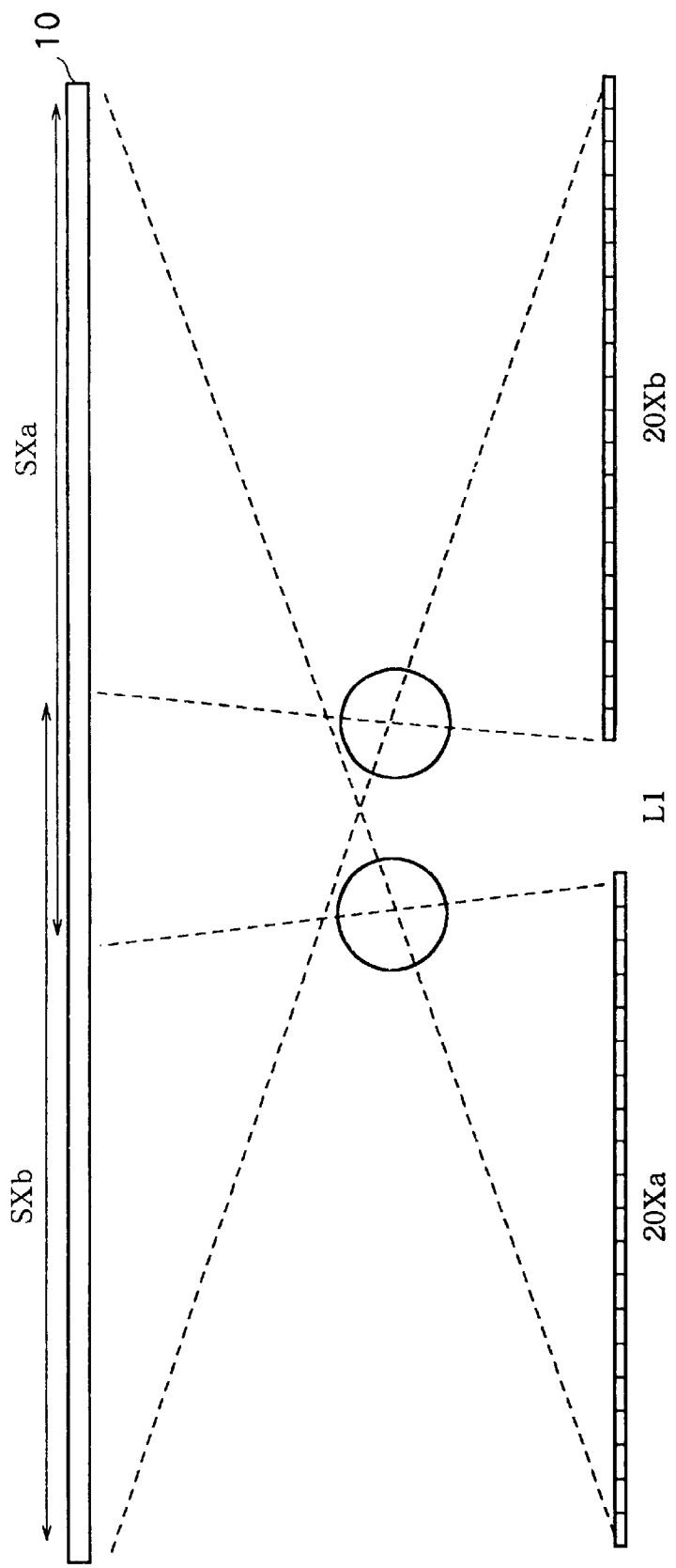
FIG. 13 is a view showing the arrangement of the linear sensors of the first embodiment.

The linear sensors 20Xa and 20Xb are constructed as vertical half detection regions of the screen 10, as shown in FIG. 13, and their detection regions overlap each other near the center of the screen.

The linear sensor 20Xa detects light when the beam spot is present within a region SXa of the screen 10, and the linear sensor 20Xb detects light when the beam spot is present within a region SXb of the screen 10. In the overlapping region, detection is made by the two sensors. The outputs from the linear sensors 20Xa and 20Xb at that time will be described below with reference to FIG. 14.

Figure 14:
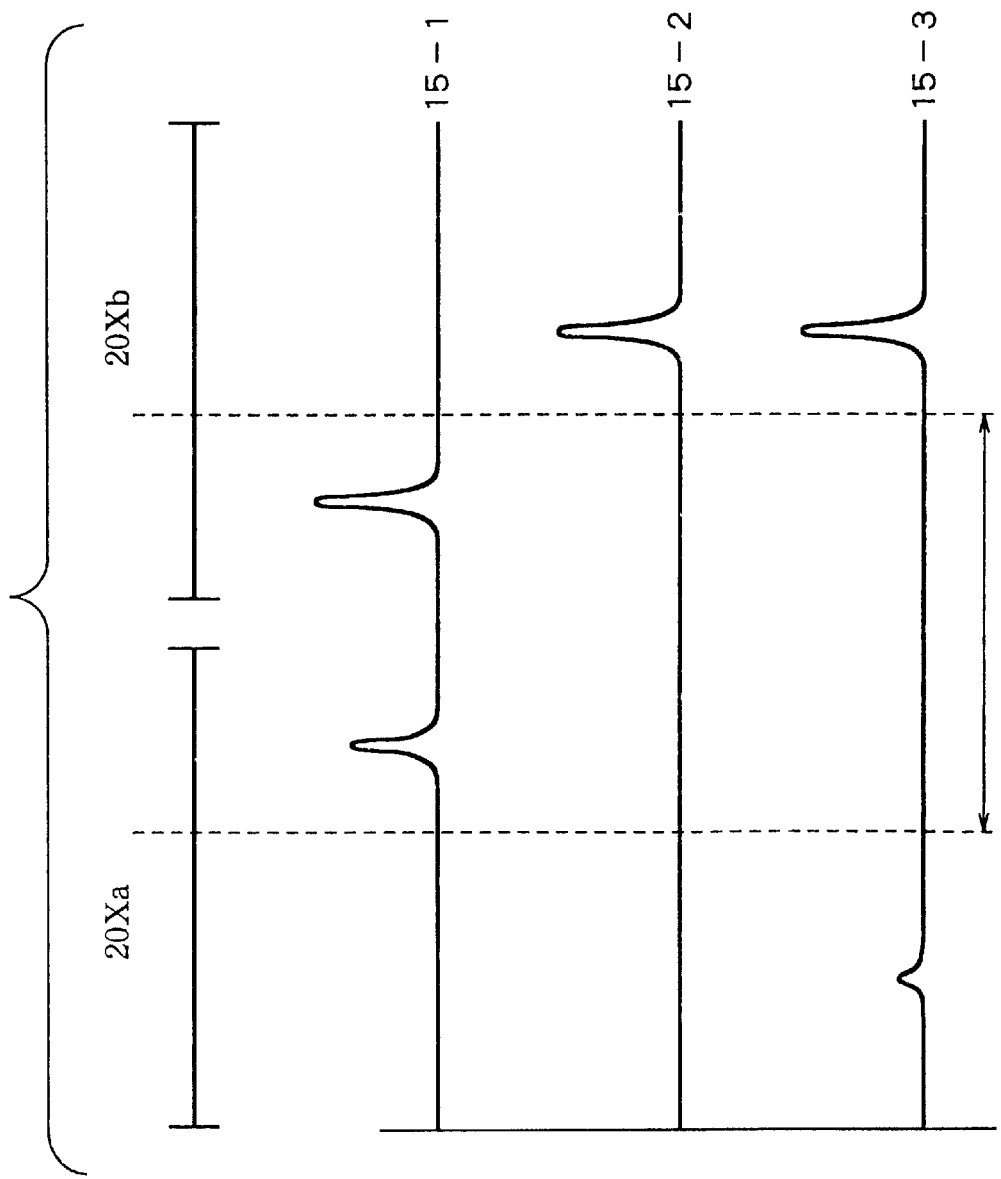
FIG. 14 is a chart illustrating the outputs from the linear sensors.

FIG. 14 illustrates the outputs from the linear sensors.

When the beam spot is located at the central overlapping region, the outputs from both the linear sensors 20X*a* and 20X*b* appear, as indicated by 15-1. On the other hand, when the beam spot is located within the region SXb, the output from only the linear sensor 20X*b* appears, as indicated by 15-2. When only one output ideally appears in a region other than the overlapping region, switching determination is made based on one coordinate value depending on whether or not that value exceeds a reference point, and coordinate values are coupled.

However, an output may be produced at a position other than the original beam spot position, as indicated by 15-3, due to noise, leakage light, disturbance light, or the like.

In such case, if determination is made using only one coordinate value, a wrong determination is made, and a cursor or the like is suddenly displayed on the display screen (for example, during drawing, an unwanted line is drawn) To avoid such problem, in the present invention, coordinate values are determined on the basis of the obtained peak values of the outputs from the linear sensors 20X*a*, 20X*b*, 20Y*a*, and 20Y*b*.

The processing flow of the coordinate computation process of the first embodiment will be described below with reference to FIG. 15.

Figure 15:
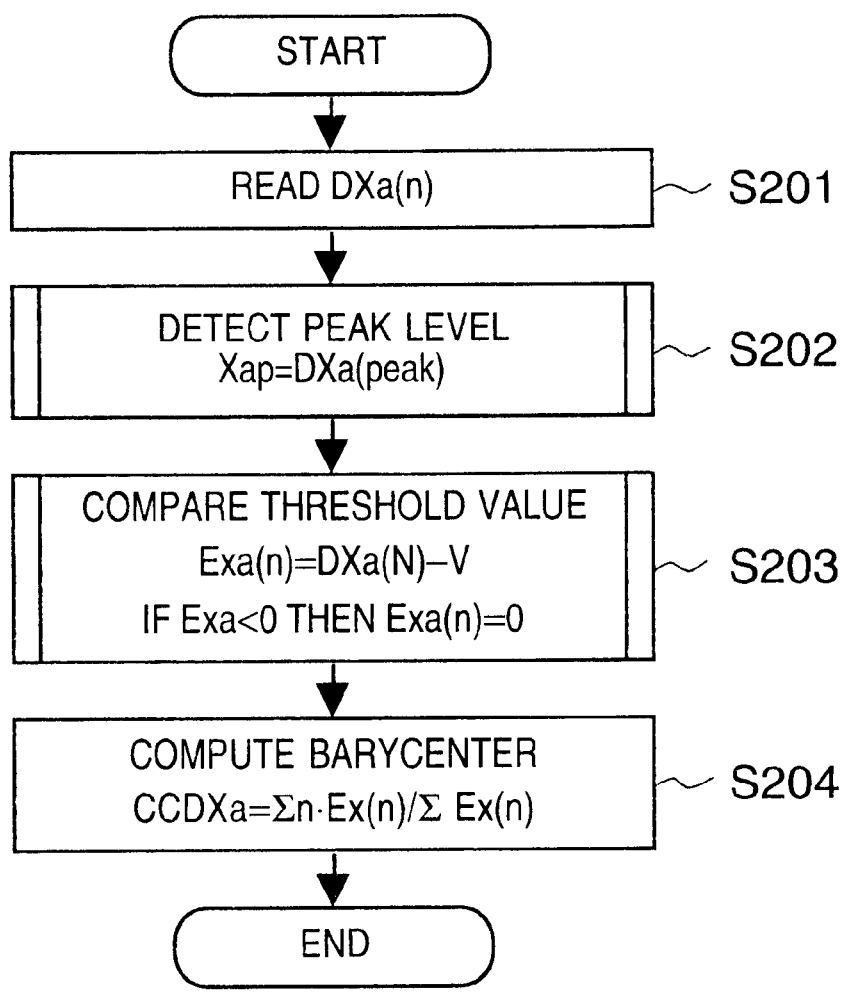
FIG. 15 is a flow chart showing the processing flow of a coordinate computation process of the first embodiment.

FIG. 15 is a flow chart showing the processing flow of the coordinate computation process of the first embodiment.

Note that DXa and DXb represent the outputs from the ring CCDs 26 of the linear sensors 20X*a* and 20X*b*. Since these values are A/D-converted values, as described above, they represent voltage values corresponding to the amounts of detected light in units of pixels of the ring CCDs 26. Hence, a peak level determined by the maximum value of respective data.

Also, CCDXa and CCDXb represent coordinates detected by the linear sensors 20X*a* and 20X*b*.

In step S201, differential data DXa(n) (in the first embodiment, the number n of pixels=64) as a differential signal of given pixels at an arbitrary coordinate input point is loaded, and is stored in a buffer memory (not shown). In step S202, a peak level of the stored data is obtained, and is stored as XaP. In step S203, the data DXa(n) is compared with a threshold value V set in advance to compute a data value Exa(n) equal to or larger than the threshold value. Using this data value Exa(n), a coordinate CCDXa on the linear sensor 20X*a* is computed in step S204. In the first embodiment, the barycenter of output data is computed by a barycenter method, but the computation method is not particularly limited (for example, a method of obtaining a peak value of output data Exa(n) (by, e.g., a differential method) may be used).

Likewise, a coordinate CCDXb on the linear sensor 20X*b* is computed.

These computed coordinate values respectively correspond to pixels on the linear CCDs 26 of the linear sensors 20X*a* and 20X*b*. For this reason, by coupling these coordinate values, the coupled value can be used as a coordinate value on a single linear sensor (20X*a*, 20X*b*).

For this purpose, a reference coordinate for coupling the coordinate values corresponding to pixels on the linear CCDs 26 of the linear sensors 20X*a* and 20X*b* is defined.

Definition of the reference coordinate will be explained below using FIG. 16

Figure 16:
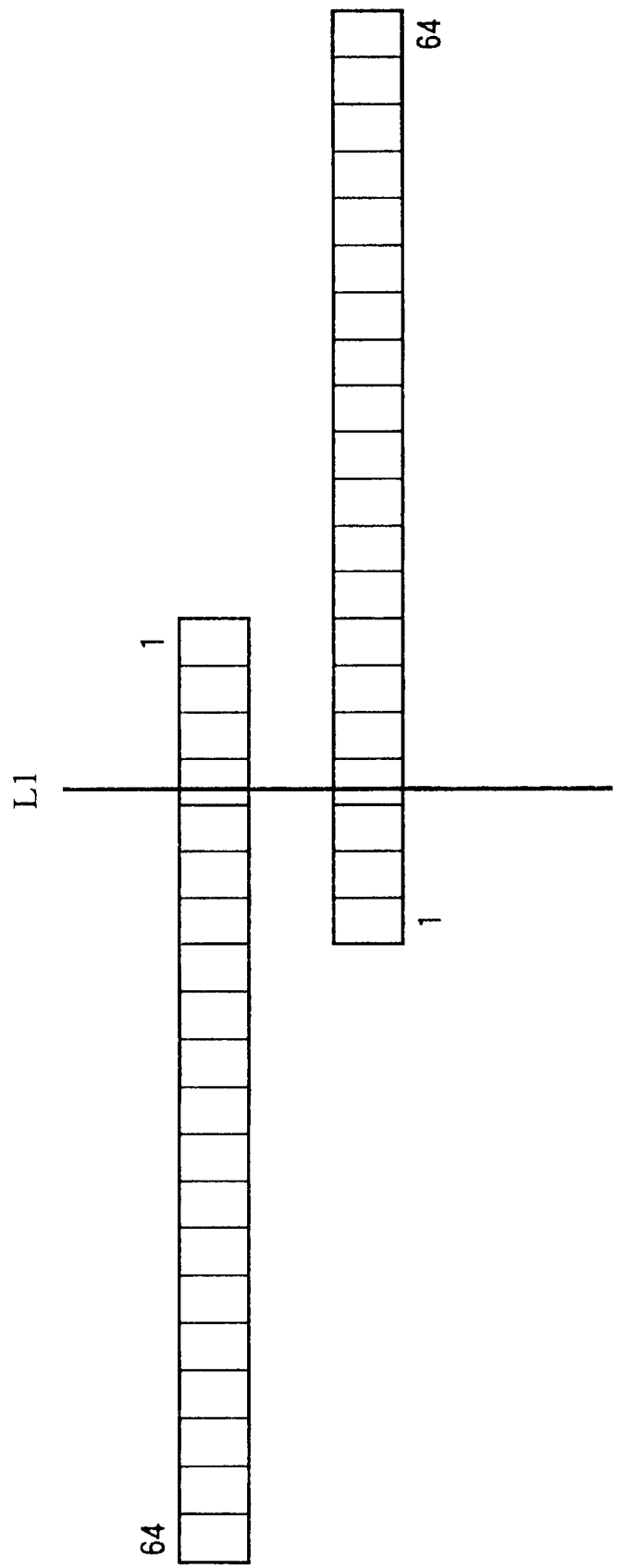
FIG. 16 is a view for explaining definition of a reference coordinate of the first embodiment.

FIG. 16 is a view for explaining definition of the reference coordinate in the first embodiment.

FIG. 16 illustrates the conceptual layouts of the coordinates of the linear CCDs 26 of the linear sensors 20X*a* and 20X*b*. Since the detection regions of the linear sensors 20X*a* and 20X*b* have an overlapping portion, as described above, their coordinate positions overlap each other, as shown in FIG. 16.

At this time, a reference point is defined in advance in a region where both the linear CCDs 26 of the linear sensors 20X*a* and 20X*b* can measure. That is, an input is made on the overlapping portion on the screen 10, and is read as coordinates CCDXa and CCDXb (CCDXa_org and CCDXb_org). These values are stored in a nonvolatile memory (not shown) such as an EEPROM as reference point data (reference coordinate), and coordinate computations are made by reading out the values in a normal use state.

The process for computing a coupled coordinate CCDX obtained by coupling the coordinate values corresponding to pixels on the linear CCDs 26 of the linear sensors 20X*a* and 20X*b* will be described below with reference to FIG. 17.

Figure 17:
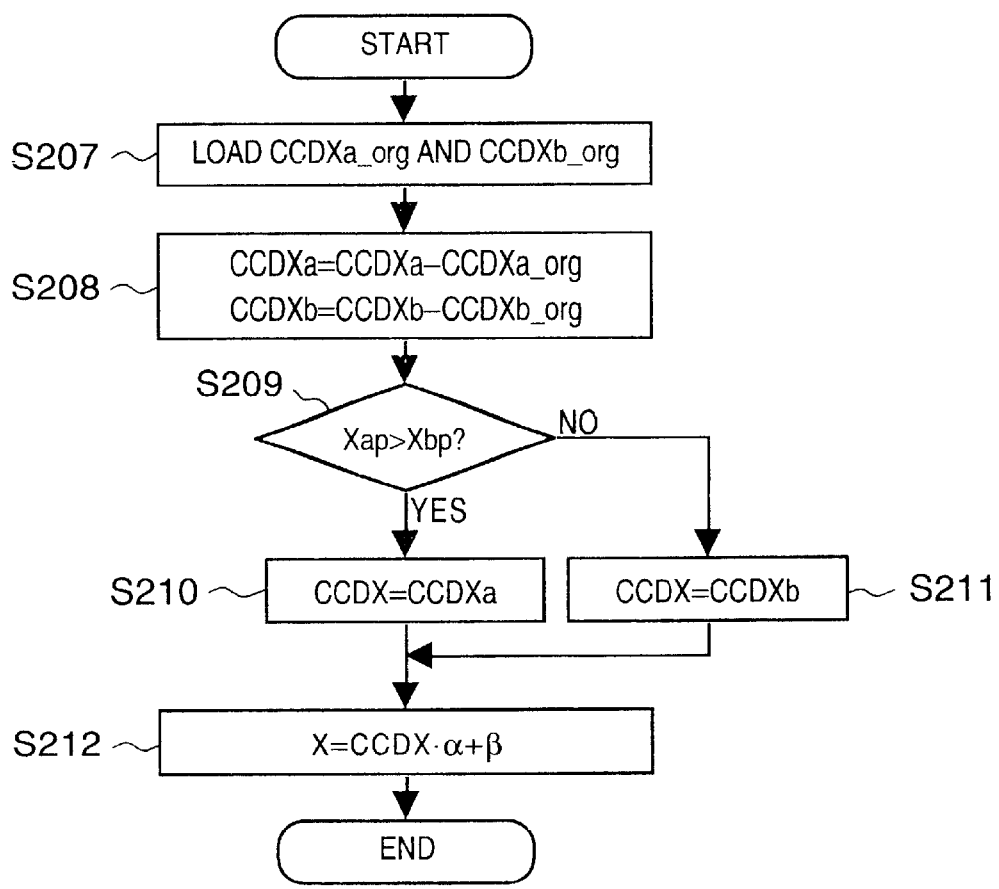
FIG. 17 is a flow chart showing the processing flow of a process for computing a coupled coordinate CCDX of the first embodiment.

FIG. 17 is a flow chart showing the processing flow of the process for computing the coupled coordinate CCDX of the first embodiment.

In step S207, the reference point data (CCDXa_org and CCDXb_org) of the linear CCDs 26 of the linear sensors 20X*a* and 20X*b* are loaded from the memory. In step S208, the differences between values CCDXa and CCDXb computed upon input from the pointing tool 4 and the reference point data are computed. In this way, the coordinate values are converted into those on a linear CCD which has a point on a line L1 near the center of FIG. 16 as an origin.

In step S209, previously stored peak levels XaP and XbP of the linear sensors 20X*a* and 20X*b* are compared. Normally, since a signal produced by, e.g., disturbance light is considerably smaller than a signal produced by a regular beam spot, a larger peak value is selected as a regular coordinate. In this manner, the coordinate values of the two linear CCDs 26 of the linear sensors 20X*a* and 20X*b* can be coupled to have L1 as a boundary.

More specifically, if the peak level XaP is larger than the peak level XbP (YES in step S209), the flow advances to step S210 to set CCDX=CCDXa, and the flow advances to step S212. On the other hand, if the peak level XaP is smaller than XbP (NO in step S209), the flow advances to step S211 to set CCDX=CCDXb, and the flow advances to step S212.

In step S212, CCDX obtained by the above process is converted into a coordinate value X on the screen 10. Conversion of the coordinate value X is done using a magnification α and offset β, which are measured in advance and are stored in, e.g., a nonvolatile memory or the like, by:

$$X = CCDX \cdot \alpha + \beta$$

Note that the magnification α and offset β can be converted from the coordinate values CCDX and coordinate values on the screen 10 obtained by making input operations at a plurality of known points in advance in the same manner as the reference point data.

The processes for the X-coordinate have been explained, and the same processes are done for the Y-coordinate.

As described above, when the coordinate value is computed using a plurality of linear CCDs 26 (i.e., those of the linear sensors 20X*a* and 20X*b*), the linear CCDs are placed to have an overlapping portion, and a reference coordinate (reference point data) point is set in that portion, thus handling these linear CCDs as a single linear CCD. Also, since variations upon attachment can also be absorbed, coordinate input on a larger region is implemented without decreasing the resolving power or the like.

Data signals indicating the coordinate values (X, Y) computed by the aforementioned computation process are sent from the coordinate computation unit 32 to the communication controller 33. The communication controller 33 receives the data signals, and a control signal from the control signal detector 72. These data signals and control signal are converted into communication signals in a predetermined format, and the converted signals are sent to an external display control device. In this manner, various operations such as cursor movement, menu selection, input of a character/line image, and the like on the screen 10 can be made.

<Description of Sync Discrimination Circuit>

As described above, in order to synchronize the signal IR (8-1 in FIG. 6) indicating the emission/non-emission timing of the pointing tool 4 with the signal IRCLK (8-2 in FIG. 6) indicating the shutter period of the linear sensors 20Xa, 20Xb, 20Ya, and 20Yb, the sensor controller 31 resets the linear sensors 20Xa, 20Xb, 20Ya, and 20Yb using the signal CLR given with a predetermined delay time $\Delta t$, thus synchronizing the emission/non-emission timings.

However, when the amount of light emitted by the pointing tool 4 decreases due to exhaustion of the internal battery of the pointing tool 4, tilt of the pointing tool 4, or the like, the signal IR becomes weak, and the signals IR and IRCLK may go out of phase due to operation errors resulting from noise or the like.

If these signals go out of phase, the outputs from the linear sensors 20Xa, 20Xb, 20Ya, and 20Yb are determined by the differences between those obtained at the emission and non-emission timings. For this reason, for example, when the output signals IR and IRCLK go out of phase by a ¼ period, the integrated amounts obtained at the emission and non-emission timings become equal to each other, and cancel each other, so that no output can be obtained. Conversely, by monitoring the output signals IR and IRCLK, if their deviation corresponds to a ¼ period, it can be determined there is no input from the pointing tool 4. If the deviation between the signals IR and IRCLK falls within the ¼ period, coordinate values different from those of the input point may be computed.

To avoid this, in the first embodiment, it is discriminated if the signals IR and IRCLK are normally synchronized. A discrimination circuit for making this discrimination will be explained below using FIG. 18.

The state of the signal IRCLK is latched by latches 18-1 and 18-2 in response to the leading and trailing edges of the signal IR. The latched signals IRCLK are input to a circuit 18-3. Only when both the latches 18-1 and 18-2 output L (low), i.e., when the emission periods matches the sampling timing upon emission, a sync signal SYNC_HI is output.

The timing chart of signals used in this discrimination circuit will be described below using FIG. 19.

Figure 19:
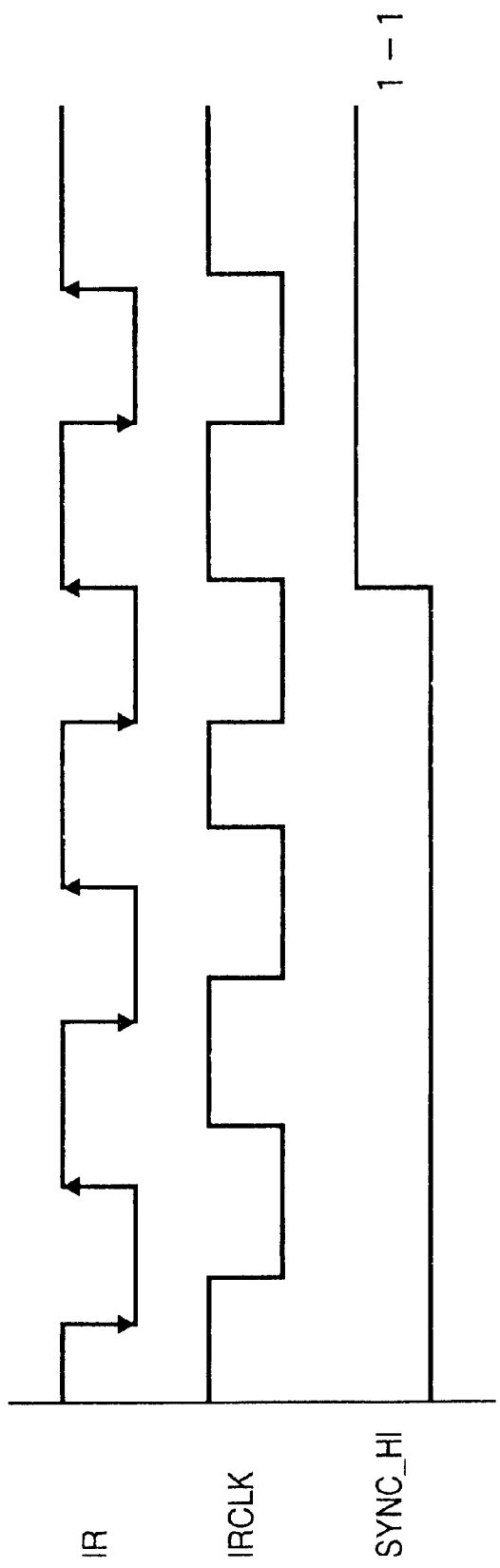
FIG. 19 is a timing chart of signals used in the discrimination circuit of the first embodiment.

FIG. 19 is a timing chart of signals used in the discrimination circuit of the first embodiment.

In the example shown in FIG. 19, the L (low) level period of the signal IR is shorter than that of the signal IRCLK. As has been described with reference to FIG. 18, only when the L (low) period of the signal IR matches that of the signal IRCLK, the signal SYNC_HI is output.

However, in this state, it is determined that the two signals are synchronized even when synchronization is attained at the end of a coordinate detection period (a time for sampling one coordinate position). In the first embodiment, since the periods of the signals IR and IRCLK are set to be nearly equal to each other, no synchronization errors take place as long as the output timing of the signal IR upon first clearing does not deviate. Hence, if the timing falls within a predetermined period after clearing, synchronization can be detected. To implement such operation, a detection circuit shown in FIG. 20 is added to the discrimination circuit shown in FIG. 18.

Figure 20:
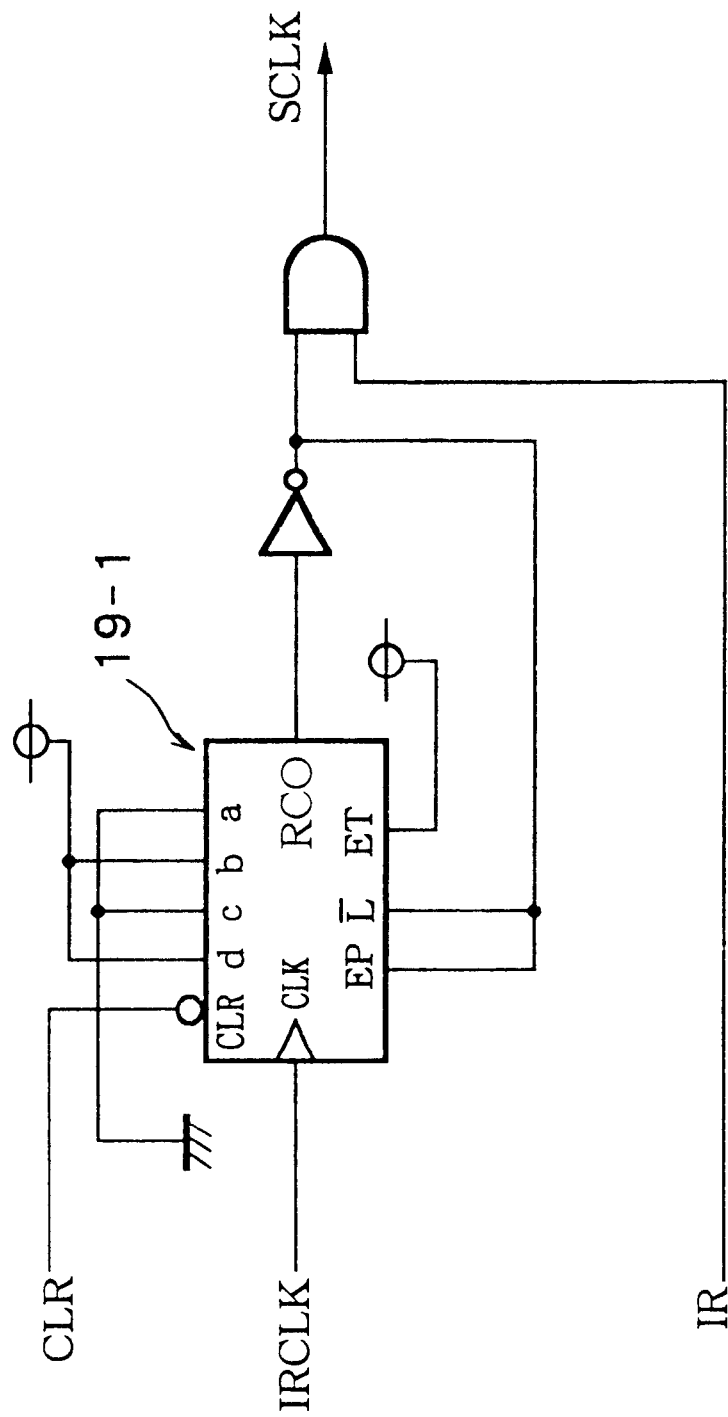
FIG. 20 is a circuit diagram showing the arrangement of a detection circuit of the first embodiment.

FIG. 20 shows the arrangement of a detection circuit of the first embodiment.

The detection circuit shown in FIG. 20 detects if any synchronization error between the signals IR and IRCLK occurs during a predetermined sampling period after clearing. Referring to FIG. 20, reference numeral 19-1 denotes a counter for measuring a predetermined period of time after clearing by counting the signal IRCLK. The counter 19-1 counts up from input of a preset value (abcd) until it reaches a full-count, and outputs a signal RCO at the time of full-count. When the signal RCO is output, since the enable terminal of the counter 19-1 is set at L (low), counting stops while the count value and RCO value remain unchanged.

Figure 18:
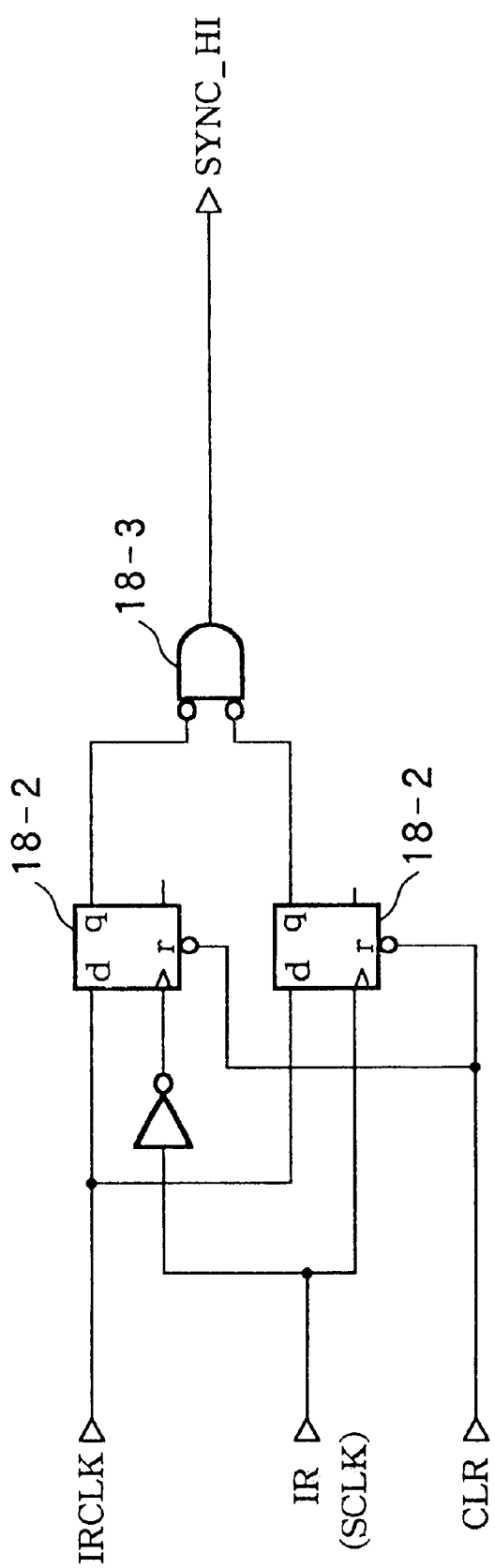
FIG. 18 is a circuit diagram showing the arrangement of a discrimination circuit of the first embodiment.

The AND output (SCLK) of the output signals RCO and IR is input in place of the signal IR of the discrimination circuit shown in FIG. 18. With this arrangement, the same signal as the signal IR is output as the signal SCLK during the predetermined count period of the signal IRCLK. However, when the counter has reached the full-count, the signal SCLK is fixed at L (low), and is not output until the next clearing period.

That is, the synchronization state from clearing until a predetermined count value of the signals IRCLK is checked, and this state is saved until the next clearing period. The controller 3 monitors the signal SCLK, and outputs a coordinate value if the signal SCLK is H (high) but stops coordinate output if the signal SCLK is L (low).

As described above, according to the first embodiment, by monitoring the synchronization state between the signals IR and IRCLK, any irregular coordinate output can be suppressed, and high-precision coordinate output can be realized.

Second Embodiment

In the first embodiment, a coordinate output is controlled by monitoring the synchronization state between the signals IR and IRCLK. In the second embodiment, more reliable coordinate output is attained by detecting the degree of synchronization.

For example, when the delay time $\Delta t$ (FIG. 6) from clearing until the signal IRCLK is output changes considerably due to the ambient temperature or a change in apparatus due to a change in temperature, if the signal CLR is output using a predetermined delay amount, the coordinate output efficiency impairs, and the integration time of the integrating section 22 is prolonged, resulting in sampling rate drop in the A/D converter 31A.

To avoid this, in the second embodiment, the degree of synchronization between the signals IR and IRCLK is detected, and the delay time $\Delta t$ (FIG. 6) of the clear signal is controlled in accordance with the detection result. A control circuit which implements this control will be explained below with reference to FIG. 21.

Figure 21:
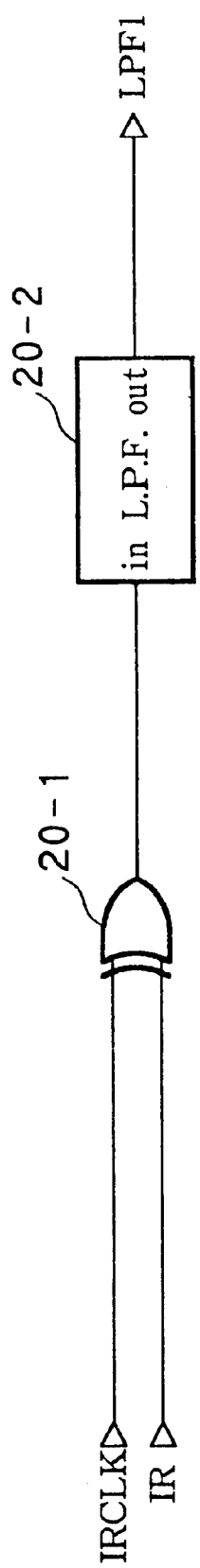
FIG. 21 is a circuit diagram showing the arrangement of a control circuit according to the second embodiment of the present invention.

FIG. 21 shows the arrangement of the control circuit of the second embodiment.

Figure 22:
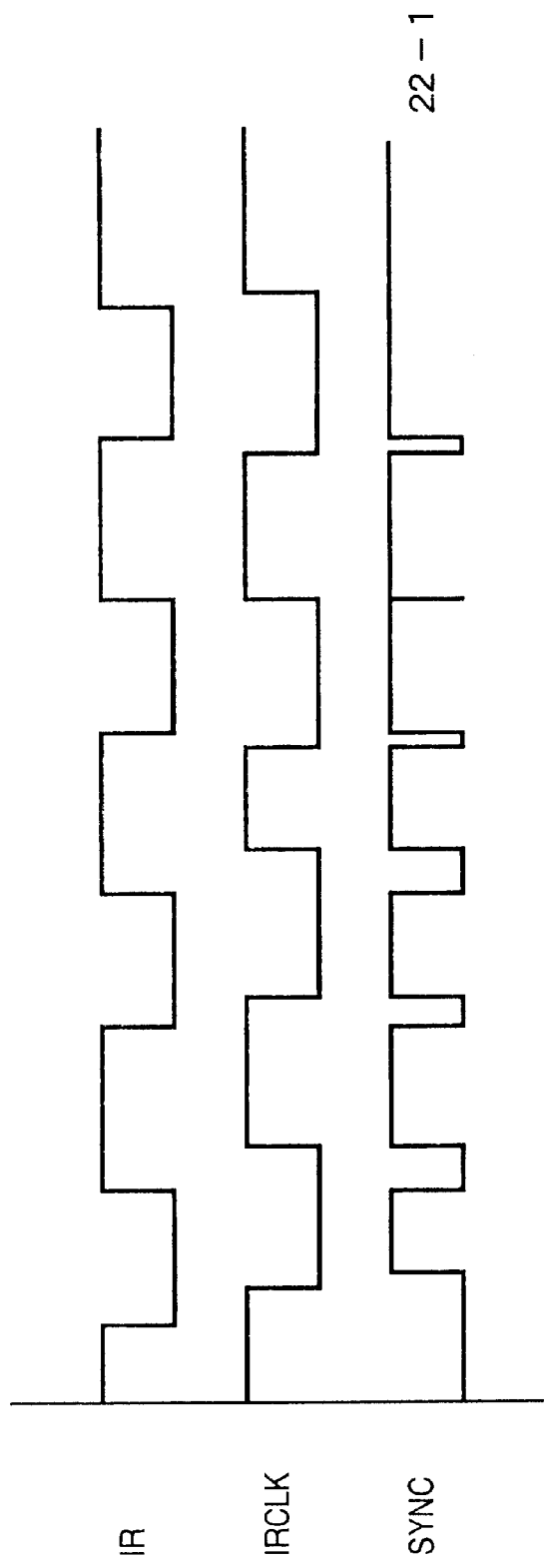
FIG. 22 is a timing chart showing signals used in the control circuit of the second embodiment.
Figure 23:
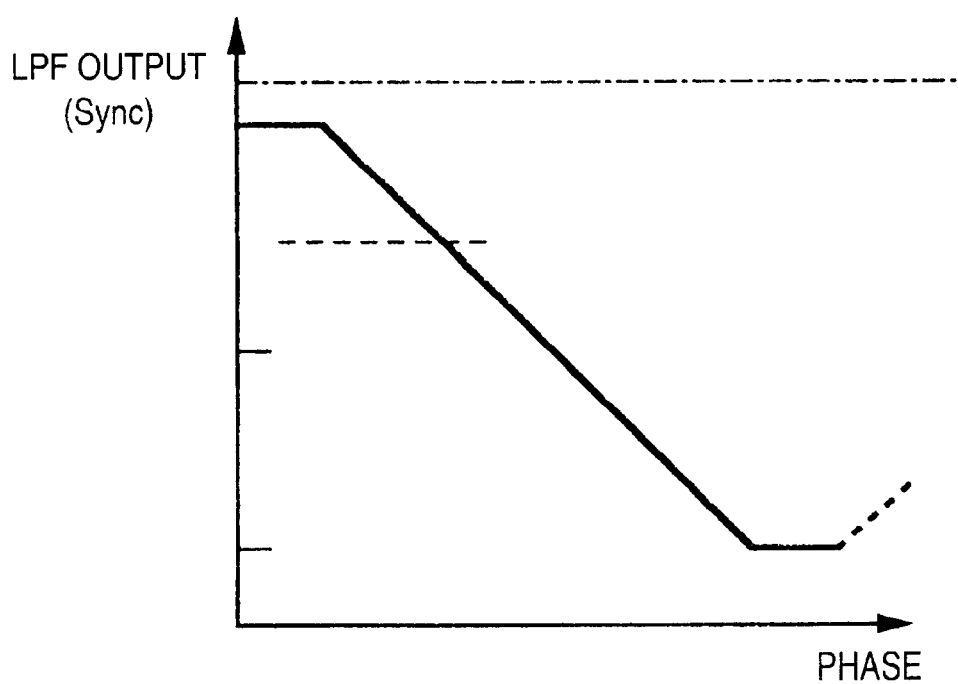
FIG. 23 is a graph showing the relationship between the LPF value and phase in the second embodiment.

As shown in FIG. 21, the signals IR and IRCLK are input to an XOR gate 20-1. The XOR gate 20-1 outputs a SYNC signal 22-1 shown in FIG. 22 depending on the degree of synchronization between the signals IR and IRCLK. That is, an H (high) output is generated when these signals are in phase; an L (low) output is generated when they are out of phase. The SYNC signal is passed by a low-pass filter (LPF) 20-2 and the output voltage rises in accordance with the magnitude of the H (high) output, as shown in FIG. 23. This output value is compared with a predetermined voltage value by a comparator or the like, and the comparison result can be used as the aforementioned signal SYNC_HI.

On the other hand, by loading this value into the controller 3 via A/D conversion or the like, the current degree of synchronization can be detected. More specifically, the current phase lag can obtained as information without a sign within the ±180 range. In order to determine the sign, the signal IR is sampled at the leading edge of the signal IRCLK, and that value can be read.

When the delay time Δt of the signal CLR with respect to the signal IR is controlled using the phase information obtained in this manner, the signals IR and IRCLK can be synchronized.

At this time, correspondence between the phase lag and delay time may be determined using a table, as shown in FIG. 23, or may be determined by repeating sampling the delay time after the delay time has changed, and repeating that operation until the output from the LPF 20-2 exceeds a predetermined level.

The synchronization control process between the signals IR and IRCLK will be described below with reference to FIG. 24.

Figure 24:
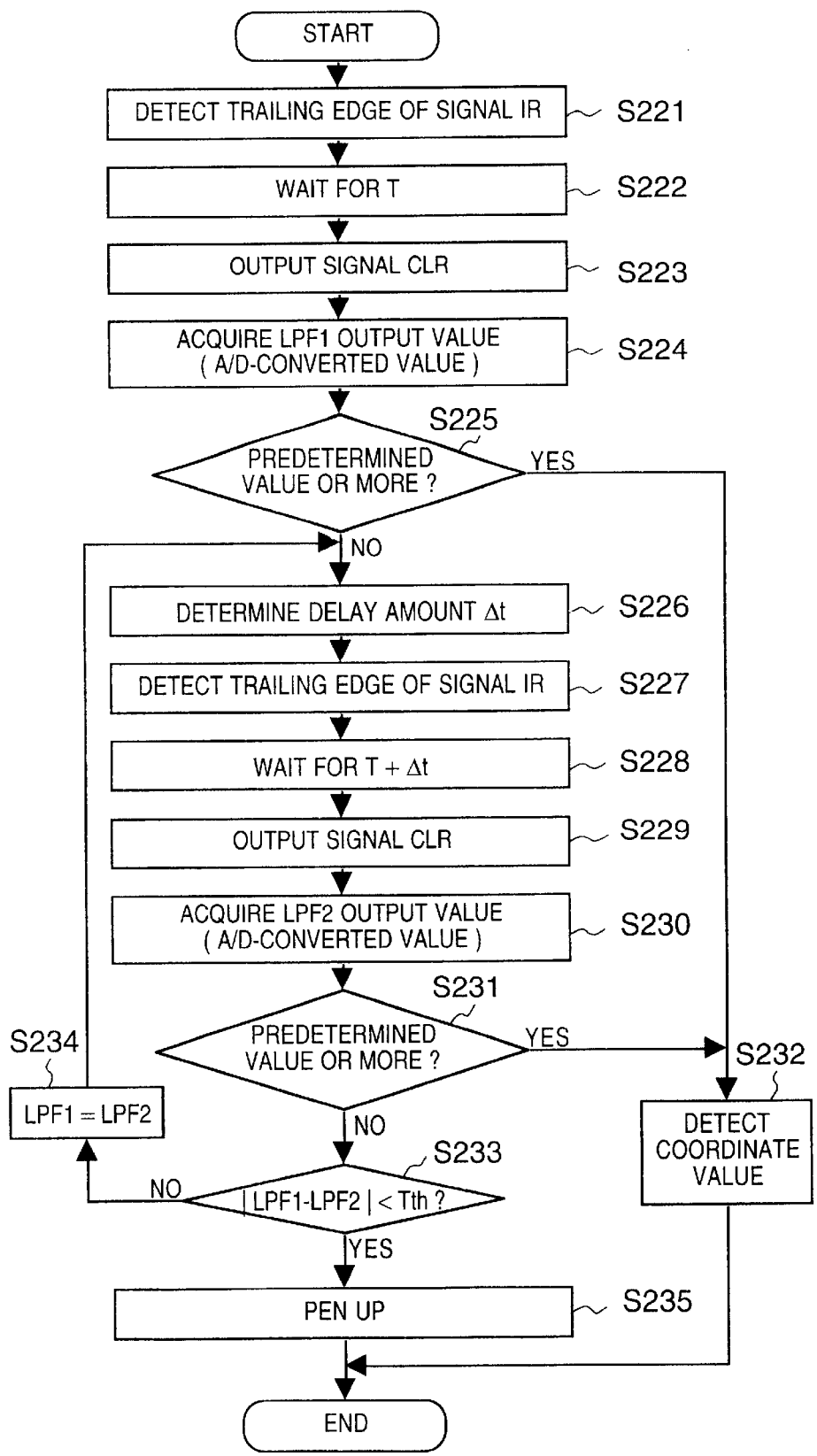
FIG. 24 is a flow chart showing a synchronization control process of signals IR and IRCLK of the second embodiment.

FIG. 24 is a flow chart showing the synchronization control process between the signals IR and IRCLK of the second embodiment.

FIG. 24 shows an operation for outputting the signal CLR upon a series of coordinate sampling processes.

After coordinate sampling starts, the trailing edge of the signal IR is detected in step S221. In this case, the signal IR is input to the port of the controller 3, and the control loops until the input value changes from H (high) to L (low). If the signal IR is not detected within a predetermined period of time, the control may exit the loop by determining "pen up".

In step S222, the control waits for a predetermined time T. In step S223, the signal CLR is output after an elapse of the time T. The linear sensors 20Xa, 20Xb, 20Ya, and 20Yb output the signal IRCLK at a timing corresponding to the signal CLR.

In step S224, a synchronization value LPF1 (the output from the LPF 20-2) between the output signal IRCLK and the signal IR is acquired. It is checked in step S225 if LPF1 is equal to or larger than a predetermined value. If LPF1 is equal to or larger than the predetermined value (YES in step S225), it is determined that synchronization is attained, and the flow advances to step S232 to start coordinate detection. On the other hand, if LPF1 is smaller than the predetermined value (NO in step S225), the flow advances to step S226.

In step S226, the delay time Δt is determined with reference to the value LPF1 and a table prepared in advance. Or a small delay time Δt may be determined by increasing the delay amount little by little, and by repetitively incrementing the delay amount until the LPF1 value exceeds a predetermined value.

In step S227, the trailing edge of the signal IR is detected. In step S228, the control waits for a time as the sum of the delay time Δt and the predetermined time T. In step S229, the signal CLR is output.

In step S230, a synchronization value LPF2 between the signals IRCLK and IR is acquired again. It is checked in step S231 if LPF2 is equal to or larger than a predetermined value. If LPF2 is equal to or larger than the predetermined value (YES in step S231), it is determined that synchronization is attained, and the flow advances to step S232 to start coordinate value detection. On the other hand, if LPF2 is smaller than the predetermined value (NO in step S231), the flow advances to step S233.

If the signal IR is considerably weak due to the influence of, e.g., noise, since the LPF value shows around an intermediate value, the difference between the previously acquired LPF1 and LPF2 values is computed, and it is checked in step S233 if the difference is smaller than a predetermined width Tth. The predetermined width Tth can be determined based on the noise amount and the like of the system. If the difference between LPF1 and LPF2 is smaller than the predetermined width Tth (YES in step S233), it is determined that no accurate signal IR can be obtained, and "pen up" is determined in step S235, thus ending coordinate sampling. On the other hand, if the difference between LPF1 and LPF2 is equal to or larger than the predetermined width Tth (NO in step S233), LPF2 is substituted in LPF1 in step S234, and the flow returns to step S226.

As described above, according to the second embodiment, the degree of synchronization between the signals IR and IRCLK is detected to control the delay time Δt of the signal CLR, thus allowing more reliable coordinate output.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

When the present invention is applied to the storage medium, that storage medium stores program codes corresponding to the flow charts shown in FIGS. 15, 17, and 24 mentioned above.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input device for generating a light spot by irradiating a predetermined position of a coordinate input surface with light coming from a pointing tool, and generating a coordinate value corresponding to the light spot, comprising:

light-receiving means for receiving flickering light coming from the pointing tool for performing emission and non-emission;

sensing means for sensing the light spot;

synchronization discrimination means for discriminating if a first signal output from said light-receiving means and a second signal output from said sensing means are synchronized, wherein the first signal indicates emission and non-emission timings of the pointing tool and the second signal indicates detection timing of the emission and non-emission timings of the pointing tool; and output means for outputting a coordinate value corresponding to the light spot on the basis of a discrimination result of said synchronization discrimination means, wherein said synchronization discrimination means comprises detection means for detecting a synchronization state between the first and second signals within a predetermined period after initiation of a sampling period, and said synchronization discrimination means discriminates on the basis of a detection result of said detection means if the first and second signals are synchronized.

2. The device according to claim 1, wherein when said synchronization discrimination means determines that the first and second signals are synchronized, said output means outputs the coordinate value corresponding to the light spot.

3. The device according to claim 1, wherein said sensing means comprises a linear array of a plurality of photoelectric conversion elements.

4. The device according to claim 3, wherein said output means comprises computation means for computing the coordinate value corresponding to the light spot at a resolving power not less than the number of pixels corresponding to the plurality of photoelectric conversion elements.

5. A coordinate input device for generating a light spot by irradiating a predetermined position of a coordinate input surface with light coming from a pointing tool, and generating a coordinate value corresponding to the light spot, comprising:

light-receiving means for receiving flickering light coming from the pointing tool for performing emission and non-emission;

sensing means for sensing the light spot;

synchronization discrimination means for discriminating if a first signal output from said light-receiving means and a second signal output from said sensing means are synchronized, wherein the first signal indicates emission and non-emission timings of the pointing tool and the second signal indicates detection timing of the emission and non-emission timings of the pointing tool; and control means for controlling a clear timing of information sensed by said sensing means on the basis of a discrimination result of said synchronization discrimination means, wherein said synchronization discrimination means comprises detection means for detecting a synchronization state between the first and second signals within a predetermined period after initiation of a sampling period, and said synchronization discrimination means discriminates on the basis of a detection result of said detection means if the first and second signals are synchronized.

6. The device according to claim 5, wherein said control means outputs a predetermined signal to said sensing means on the basis of the discrimination result of said synchronization discrimination means.

7. The device according to claim 6, wherein said control means determines an output timing of the predetermined signal in accordance with a synchronization state between the first and second signals, which is discriminated by said synchronization discrimination means.

8. The device according to claim 6, wherein the predetermined signal instructs to clear sensing contents of said sensing means.

9. The device according to claim 5, further comprising output means for outputting a coordinate value corresponding to the light spot on the basis of a discrimination result of said synchronization discrimination means.

10. A method of controlling a coordinate input device for generating a light spot by irradiating a predetermined position of a coordinate input surface with light coming from a pointing tool, and generating a coordinate value corresponding to the light spot, comprising:

a light-receiving step of receiving flickering light coming from the pointing tool for performing emission and non-emission;

a sensing step of sensing the light spot using a sensor;

a synchronization discrimination step of discriminating if a first signal output in the light-receiving step and a second signal output from the sensor are synchronized, wherein the first signal indicates emission and non-emission timings of the pointing tool and the second signal indicates detection timing of the emission and non-emission timings of the pointing tool; and an output step of outputting a coordinate value corresponding to the light spot on the basis of a discrimination result in the synchronization discrimination step, wherein said synchronization discrimination step includes the steps of detecting a synchronization state between the first and second signals within a predetermined period after initiation of a sampling period, and discriminating on the basis of the detection if the first and second signals are synchronized.

11. The method according to claim 10, wherein the output step outputs the coordinate value corresponding to the light spot, when it is determined in the synchronization discrimination step that the first and second signals are synchronized.

12. The method according to claim 10, wherein the sensor comprises a linear array of a plurality of photoelectric conversion elements.

13. The method according to claim 10, wherein the output step comprises a computation step of computing the coordinate value corresponding to the light spot at a resolving power not less than the number of pixels corresponding to the plurality of photoelectric conversion elements.

14. A method of controlling a coordinate input device for generating a light spot by irradiating a predetermined position of a coordinate input surface with light coming from a pointing tool, and generating a coordinate value corresponding to the light spot, comprising:

a light-receiving step of receiving flickering light coming from the pointing tool for performing emission and non-emission;

a sensing step of sensing the light spot using a sensor;

a synchronization discrimination step of discriminating if a first signal output in the light-receiving step and a second signal output from the sensor are synchronized, wherein the first signal indicates emission and non-emission timings of the pointing tool and the second signal indicates detection timing of the emission and non-emission timings of the pointing tool; and a control step of controlling a clear timing of information sensed by the sensor on the basis of a discrimination result in the synchronization discrimination step, wherein said synchronization discrimination step includes the steps of detecting a synchronization state between the first and second signals within a predetermined period after initiation of a sampling period, and discriminating on the basis of the detection if the first and second signals are synchronized.

15. The method according to claim 14, wherein the control step outputs a predetermined signal to the detection unit on the basis of the discrimination result in the synchronization discrimination step.

16. The method according to claim 15, wherein the control step determines an output timing of the predetermined signal in accordance with a synchronization state between the first and second signals, which is discriminated in the synchronization discrimination step.

17. The method according to claim 15, wherein the predetermined signal instructs to clear sensing contents of the sensor.

18. The method according to claim 14, further comprising an output step of outputting a coordinate value corresponding to the light spot on the basis of a discrimination result in the synchronization discrimination step.

19. A computer readable memory which stores a program code of controlling a coordinate input device for generating a light spot by irradiating a predetermined position of a coordinate input surface with light coming from a pointing tool, and generating a coordinate value corresponding to the light spot, comprising:

a program code of a light-receiving step of receiving flickering light coming from the pointing tool for performing emission and non-emission;

a program code of a sensing step of sensing the light spot using a sensor;

a program code of a synchronization discrimination step of discriminating synchronization between a first signal output in the light-receiving step, and a second signal output from the sensor, wherein the first signal indicates emission and non-emission timings of the pointing tool and the second signal indicates detection timing of the emission and non-emission of the pointing tool; and a program code of an output step of outputting a coordinate value corresponding to the light spot on the basis of a discrimination result in the synchronization discrimination step, wherein said synchronization discrimination step includes the steps of detecting a synchronization state between the first and second signals within a predetermined period after initiation of a sampling period, and discriminating on the basis of the detection if the first and second signals are synchronized.

20. A computer readable memory which stores a program code of controlling a coordinate input device for generating a light spot by irradiating a predetermined position of a coordinate input surface with light coming from a pointing tool, and generating a coordinate value corresponding to the light spot, comprising:

a program code of a light-receiving step of receiving flickering light coming from the pointing tool for performing emission and non-emission;

a program code of a sensing step of sensing the light spot using a sensor;

a program code of a synchronization discrimination step of discriminating synchronization between a first signal output in the light-receiving step, and a second signal output from the sensor, wherein the first signal indicates emission and non-emission timings of the pointing tool and the second signal indicates detection timing of the emission and non-emission timings of the pointing tool; and a program code of a control step of controlling a clear timing of information sensed by the sensor on the basis of a discrimination result in the synchronization discrimination step, wherein said synchronization discrimination step includes the steps of detecting a synchronization state between the first and second signals within a predetermined period after initiation of a sampling period, and discriminating on the basis of the detection if the first and second signals are synchronized.

* * * * *

UNITED STATES PATENT AND TRADEMARK OFFICE
CERTIFICATE OF CORRECTION

PATENT NO. : 6,731,271 B1
DATED : May 4, 2004
INVENTOR(S) : Atsushi Tanaka et al.

It is certified that error appears in the above-identified patent and that said Letters Patent is hereby corrected as shown below:

Title page,
Item [30], Foreign Application Priority Data,
"Mar. 19, 1999 (JP) .................................. 11-076861" should read
-- Mar. 19, 199 (JP) .................................. 11-076862 --.

Column 6,
Line 4, "sate," should read -- state, --.

Column 11,
Line 63, "FIG. 16" should read -- FIG. 16. --.

Signed and Sealed this

Seventh Day of December, 2004

JON W. DUDAS
*Director of the United States Patent and Trademark Office*

UNITED STATES PATENT AND TRADEMARK OFFICE
CERTIFICATE OF CORRECTION

PATENT NO. : 6,731,271 B1
DATED : May 4, 2004
INVENTOR(S) : Atsushi Tanaka et al.

It is certified that error appears in the above-identified patent and that said Letters Patent is hereby corrected as shown below:

Title page,
Item [30], Foreign Application Priority Data:
"Mar. 19, 199   (JP)          11-076862" should read
-- Mar. 19, 1999  (JP)          11-076862 --.

Signed and Sealed this

First Day of November, 2005

JON W. DUDAS
*Director of the United States Patent and Trademark Office*